United States Patent
Naoi et al.

(10) Patent No.: US 8,911,139 B2
(45) Date of Patent: Dec. 16, 2014

(54) INTERNAL BATCH MIXER WITH ALARM

(75) Inventors: Masaki Naoi, Takasago (JP); Yusuke Tanaka, Takasago (JP); Taro Uchida, Takasago (JP)

(73) Assignee: Kobe Steel, Ltd., Kobe-Shi ( * ) Notice: Subject to any disclaimer, the term of this patent is extended or adjusted under 35 U.S.C. 154(b) by 816 days.

(21) Appl. No.: 13/143,238

(22) PCT Filed: Jan. 7, 2010

(86) PCT No.: PCT/JP2010/050088
§ 371 (c)(1),
(2), (4) Date: Jul. 5, 2011

(87) PCT Pub. No.: WO2010/082526
PCT Pub. Date: Jul. 22, 2010

(65) Prior Publication Data
US 2011/0267919 A1  Nov. 3, 2011

(30) Foreign Application Priority Data

Jan. 13, 2009  (JP) ................................ 2009-004179
Jan. 13, 2009  (JP) ................................ 2009-004242

(51) Int. Cl.
*B29B 7/28* (2006.01)
*B29B 7/18* (2006.01)
*B29B 7/26* (2006.01)

(52) U.S. Cl.
CPC ................. *B29B 7/183* (2013.01); *B29B 7/263* (2013.01)
USPC ............. 366/76.7; 366/77; 366/142; 366/331

(58) Field of Classification Search
USPC ............ 366/76.1, 76.2, 76.7, 76.8, 76.93, 77, 366/142, 189, 192, 194–196, 331; 425/204, 425/208, 209
See application file for complete search history.

(56) References Cited

U.S. PATENT DOCUMENTS 3,099,040 A   7/1963   Matsuoka
3,610,585 A   10/1971  MacLeod et al.
(Continued)

FOREIGN PATENT DOCUMENTS

EP   0 262 917 A2   4/1988
EP   0 262 917 A3   4/1988
(Continued)

OTHER PUBLICATIONS

Korean Office Action issued Nov. 6, 2012 in Patent Application No. 10-2011-7016096 with English Translation.
(Continued)

*Primary Examiner* — Charles Cooley
(74) *Attorney, Agent, or Firm* — Oblon, Spivak, McClelland, Maier & Neustadt, L.L.P.

(57) ABSTRACT

An internal batch mixer is provided with: a casing within which a material is mixed; a door which opens and closes a material discharge opening of the casing by being rotated about the axis thereof and closes the material discharge opening when in a closed state; and a latch mechanism which, when the material is mixed in the casing, holds the door in a latched state, the latched state being a state in which the material discharge opening is being closed by the door and cannot be opened, and which, when the material having been mixed in the casing is discharged from the inside of the casing, releases the door from the latched state. The latch mechanism is provided with a linear actuator which has a movable section capable of moving linearly and moves the movable section to the door side to supply power to the latch member, the power causing the latch member to move to the door side, and a linear sensor for measuring the distance of linear movement of the movable section caused by the linear actuator. Information relating to the displacement of the latch member is displayed on a display device on the basis of the distance of linear movement of the movable section measured by the linear sensor.

8 Claims, 11 Drawing Sheets

(56) References Cited

U.S. PATENT DOCUMENTS

| | | | |
|---|---|---|---|
| 4,775,240 A | 10/1988 | Passoni | |
| 4,818,113 A * | 4/1989 | Patel | 366/76.2 |
| 4,830,506 A * | 5/1989 | Borzenski | 366/76.2 |
| 4,953,984 A * | 9/1990 | Miyoshi | 366/76.2 |
| 5,061,078 A * | 10/1991 | Yada | 366/76.2 |
| 5,324,107 A * | 6/1994 | Tanaka et al. | 366/76.3 |
| 5,492,403 A | 2/1996 | Metcalf et al. | |
| 5,783,983 A * | 7/1998 | Ureshino et al. | 366/76.7 |
| 5,865,535 A * | 2/1999 | Edwards | 366/76.7 |
| 8,047,701 B2 * | 11/2011 | Naoi | 366/76.7 |
| 8,485,714 B2 * | 7/2013 | Naoi et al. | 366/76.7 |
| 8,714,806 B2 * | 5/2014 | Naoi et al. | 366/100 |
| 2003/0010197 A1 | 1/2003 | Zilioli | |
| 2003/0112699 A1* | 6/2003 | Hader et al. | 366/85 |
| 2004/0179424 A1* | 9/2004 | Yamada et al. | 366/76.8 |
| 2007/0008230 A1 | 1/2007 | Osaka et al. | |
| 2007/0025176 A1* | 2/2007 | Naoi | 366/76.7 |
| 2009/0238029 A1 | 9/2009 | Naoi et al. | |
| 2010/0156051 A1* | 6/2010 | Moribe et al. | 277/558 |
| 2011/0267919 A1* | 11/2011 | Naoi et al. | 366/142 |
| 2012/0020181 A1* | 1/2012 | Naoi et al. | 366/176.3 |

FOREIGN PATENT DOCUMENTS

| | | |
|---|---|---|
| EP | 1 747 868 A2 | 1/2007 |
| EP | 1 747 868 A3 | 1/2007 |
| JP | 61 244926 | 10/1986 |
| JP | 61-244926 | 10/1986 |
| JP | 62 234533 | 10/1987 |
| JP | 2 152766 | 6/1990 |
| JP | 3-164812 | 7/1991 |
| JP | 6 32010 | 4/1994 |
| JP | 9-220456 | 8/1997 |
| JP | 9 220456 | 8/1997 |
| JP | 10-151333 | 6/1998 |
| JP | 10 151333 | 6/1998 |
| JP | 10 230153 | 9/1998 |
| JP | 2003 311816 | 11/2003 |
| JP | 2007-16831 | 1/2007 |
| TW | 200806386 | 2/2008 |

OTHER PUBLICATIONS

Combined Office Action and Search Report issued Mar. 28, 2013, in Taiwanese Patent Application No. 099100807 (with English-language translation).

International Search Report Issued Feb. 2, 2010 in PCT/JP10/050088 filed Jan. 7, 2010.

U.S. Appl. No. 13/260,112, filed Sep. 23, 2011, Naoi, et al.

Extended Search Report issued Aug. 12, 2013 in European Patent Application No. 10731195.3.

Notification of Reasons for Refusal issued May 21, 2013 in Japanese Patent Application No. 2009-004242 (with English translation).

Notification of Reasons for Refusal issued May 21, 2013 in Japanese Patent Application No. 2009-004179 (with English translation).

* cited by examiner

INTERNAL BATCH MIXER WITH ALARM

TECHNICAL FIELD

The present invention relates to an internal batch mixer.

BACKGROUND ART

An example of a conventional internal batch mixer is disclosed in the following Patent Literature 1. In an internal batch mixer of Patent Literature 1, a mixing chamber is formed inside a casing, and mixing rotors are disposed within the mixing chamber. The casing includes a discharge opening formed to extend in the axial direction of the mixing rotor, and a drop door provided to open and close the discharge opening. The drop door prevents outflow of a material by blocking the discharge opening during mixing of the material within the mixing chamber. When the material mixed in the mixing chamber is discharged, the drop door is rotated and opened downwardly.

This internal batch mixer further includes a latch device that is a lock mechanism for the drop door. The latch device includes a latch and a hydraulic cylinder. The latch is installed to move forward and backward so as to slide relative to the drop door. The drop door is locked by pressing a contact surface of the latch onto a contact surface of the drop door by the hydraulic cylinder, and the airtightness within the mixing chamber is consequently maintained. When the latch is retracted, the drop door becomes openable.

In a conventional apparatus as described above, repetitive opening and closing operation of the drop door causes wear at a contact area between the drop door and the latch. For example, the wear is caused on a contact plate of the door on the door side and on a latch striker of the latch on the latch side. Therefore, in the past, a wear status for contact parts (consumable parts) has been visually confirmed by dispatching a worker to a place where the latch device can be viewed.

The conventional visual confirmation of wear status for the contact parts has been performed also by installing a scale plate on a base part of the mixer, attaching a landmark member to a piston rod of the hydraulic cylinder, and comparing a position of the landmark member with a scale of the scale plate.

Accordingly, confirmation of wear status for a component or as-needed replacement of the component requires the reading operation of the scale or the position readjustment operation of the scale plate.

However, since the hydraulic cylinder is generally in a location distant from the work area of a mixer's operator during mixing operation, it is troublesome for the operator to perform the above-mentioned confirmation during the mixing operation. Further, since the scale plate is generally covered with a dust collecting cover or the like, the confirmation operation or the readjustment operation is not easy. The dust collecting cover may be provided with a switch of a safety device. In this case, it is difficult to perform the above-mentioned confirmation operation during the operation of the mixer since the mixer is shut down when the dust collecting cover is opened during the operation.

Even if the above-mentioned confirmation operation or readjustment operation is possible from the viewpoint of machine structure, the confirmation operation is difficult just the same since the scale plate is contaminated in a work environment which needs dust collection. Therefore, it is common to perform the above-mentioned confirmation operation while the operation of the mixer is stopped.

The confirmation of the wear status, or the confirmation of the scale plate or the like, can be delayed depending on the operation cycle of the mixer. If the wear of the contact part is left in the meantime, damage on machine components such as deformation of a thin portion at the edge of the discharge opening, that is to contact with the drop door in the casing, is caused when the latch mechanism is, for example, of toggle type. When the latch mechanism is of slide type, also, the wear is similarly caused in the contact area between the door and the latch. If the replacement time of contact part is missed, the casing or the like that is a durable component is also damaged. Since it is generally difficult to continuously grasp the wear status with respect to such a contact part in the latch mechanism, the replacement time thereof can be hardly predicted. In this way, neglect of the wear status in the contact area causes damages on machine components in both the toggle type and the slide type of latch mechanisms.

As described above, in the latch device of the conventional internal batch mixer, it is difficult to grasp the wear status of mutual contact portions of the door and the latch member, which are wearing members.

The following Patent Literature 2 discloses an internal batch mixer provided with a seal mechanism. The seal mechanism prevents mixing material within a mixing chamber from leaking out of the mixing chamber from an area in the vicinity of an end portion of a mixing rotor within the mixing chamber.

This seal mechanism includes a seal member which prevents the leak of mixing material out of the mixing chamber by being pressed onto the end portion of the rotor in the axial direction of the rotor. The seal member is composed of a rotation-side seal member fixed to an end surface of the rotor, and a fixed-side seal member fixed to an end surface of a dust stop ring through which the rotor shaft is inserted. These rotation-side seal member and fixed-side seal member are consumable members which are worn away through mutual sliding. In Patent Literature 2, one of these seal members is formed by use of a material consisting of a resin compound filled with graphite or short carbon fiber not more than ½ inch in fiber length. This allows a reduced value of friction coefficient of the sliding surfaces of both the seal members to suppress the heat generation or wear of both the seal members that are consumable members.

One of techniques relating to the seal mechanism for internal batch mixer is described in the following Patent Literature 3. In the technique described in Patent Literature 3, the heat generation or wear of the seal members is suppressed by rotating a first sleeve having a frictional wearing member fixed to an end surface thereof, which corresponds to the above-mentioned fixed-side seal member, in a rotor rotating direction at a rotating speed lower than the rotating speed of the rotor shaft, thereby reducing the mutual sliding speed of the seal members.

Another technique relating to the seal mechanism is also described in the following Patent Literature 4. In the technique described in Patent Literature 4, internal pressure of the mixing chamber is measured, and seal pressure, or biasing force of a seal ring to a collar ring, is appropriately adjusted in response to the measured value of pressure by an adjustment means having a hydraulic cylinder. When the mixing chamber is low in internal pressure at the terminal stage of mixing process or the like, the life of the seal members can be extended by reducing the seal pressure.

Each of the techniques descried in Patent Literatures 2 to 4 is intended to extend the life of seal members that are consumable members by preventing the wear of the seal members. However, these seal members are consistently consumable members. Therefore, these seal members wear down little by little, and reach the end of their lives at some stage. In other words, the seal members are members which reach their application limits at some stage. On the other hand, the operator hardly confirm sliding seal portions of the seal members during the mixing operation of the mixer since the position of the seal members is distant from the operator's work area during the operation. For grasping the abrasion loss of the seal members, further, the operator must confirm a depth of wear as small as several mm. Moreover, it is difficult to confirm the abrasion loss of the seal members based on a machined part around the seal members since machined parts are fewer around the seal members in the mixer. Even if the abrasion loss of the seal portion is to be measured based on the machined part, it is substantially impossible to carry out this measurement during mixing operation. From these reasons, it often happens that a countermeasure such as replacement of seal member is taken once after dust of the mixing material begins to leak through the seal portion.

When the dust of the mixing material begins to leak through the seal portion, breakage of piping or a temperature sensor in the vicinity of the leaked mixing material is also feared in addition to damages on counter members of the mutually-sliding sliding surfaces. The breakage of the piping or temperature sensor results in further serious damage. Further, the leak of mixing material requires disposal of the leaked mixing material. A high leakage rate of the mixing material leads to deterioration of work efficiency due to the necessity of cleaning of the periphery of the mixer.

As described above, a technique for grasping the wear level of a seal member that is a wearing member in the conventional seal mechanism for internal batch mixer was needed.

CITATION LIST

Patent Literature

Patent Literature 1: Japanese Patent Application Laid-Open No. 9-220456
Patent Literature 2: Japanese Patent No. 3620944
Patent Literature 3: Japanese Patent Application Laid-Open No. 10-151333
Patent Literature 4: Japanese Utility Model Application Laid-Open No. 6-32010

SUMMARY OF THE INVENTION

An object of the present invention is to provide an internal batch mixer capable of solving the above-mentioned problems.

The other object of the present invention is to provide an internal batch mixer, which facilitates grasp of wear level of a wearing member (consumable member) even during the operation of the internal batch mixer.

An internal batch mixer according to one aspect of the present invention includes: a mixing device for mixing material; and a display device provided outside the mixing device, wherein the mixing device includes: a casing in which the material is mixed and which has a material discharge opening formed to discharge the mixed material; a door which opens and closes the material discharge opening by rotating around a shaft, and blocks the material discharge opening when it is in a closed state; and a latch mechanism which holds, during mixing of the material within the casing, the door in a latched state, the latched state being a state in which the latch mechanism presses the door to the casing so that the door blocks the material discharge opening and cannot be opened, and which releases the latched state when discharging the material mixed within the casing out of the casing, the latch mechanism includes: a latch member provided to be contactable with the door; a linear actuator which has a linearly-movable moving part and supplies power to the latch member to direct the latch member to the door side by moving the moving part toward the door; and a linear sensor which measures distance of linear movement of the moving part by the linear actuator, and the display device displays displacement information of the latch member based on the distance of linear movement of the moving part measured by the linear sensor.

An internal batch mixer according to the other aspect of the present invention includes: a mixing device for mixing material; and a display device provided outside the mixing device, wherein the mixing device includes: a casing having a mixing chamber inside; a rotor inserted to the mixing chamber; a rotor shaft provided to protrude from a rotor end surface that is an end surface in the axial direction of the rotor; and a dust stop device for arresting leak of the material within the mixing chamber to the outside, and the dust stop device includes: a rotation-side seal member fixed to the rotor end surface to be rotated integrally with the rotor; a ring-like fixed-side seal member through which the rotor shaft is rotatably inserted; and a pressing force imparting mechanism which biases the fixed-side seal member toward the rotor end surface so that the fixed-side seal member is in pressure contact with the rotation-side seal member, and the pressing force imparting mechanism includes: a linear actuator which has a moving part provided to be movable in the axial direction of the rotor, and biases the fixed-side seal member toward the rotor end surface by moving the moving part toward the rotor end surface; and a linear sensor attached to the linear actuator to detect displacement of the moving part in the axial direction of the rotor, and the display device displays displacement information of the fixed-side seal member based on a detection value by the linear sensor in a state where the fixed-side seal member is in pressure contact with the rotation-side seal member by the pressing force imparting mechanism.

MODE FOR CARRYING OUT THE INVENTION

[First Embodiment]

Figure 1:
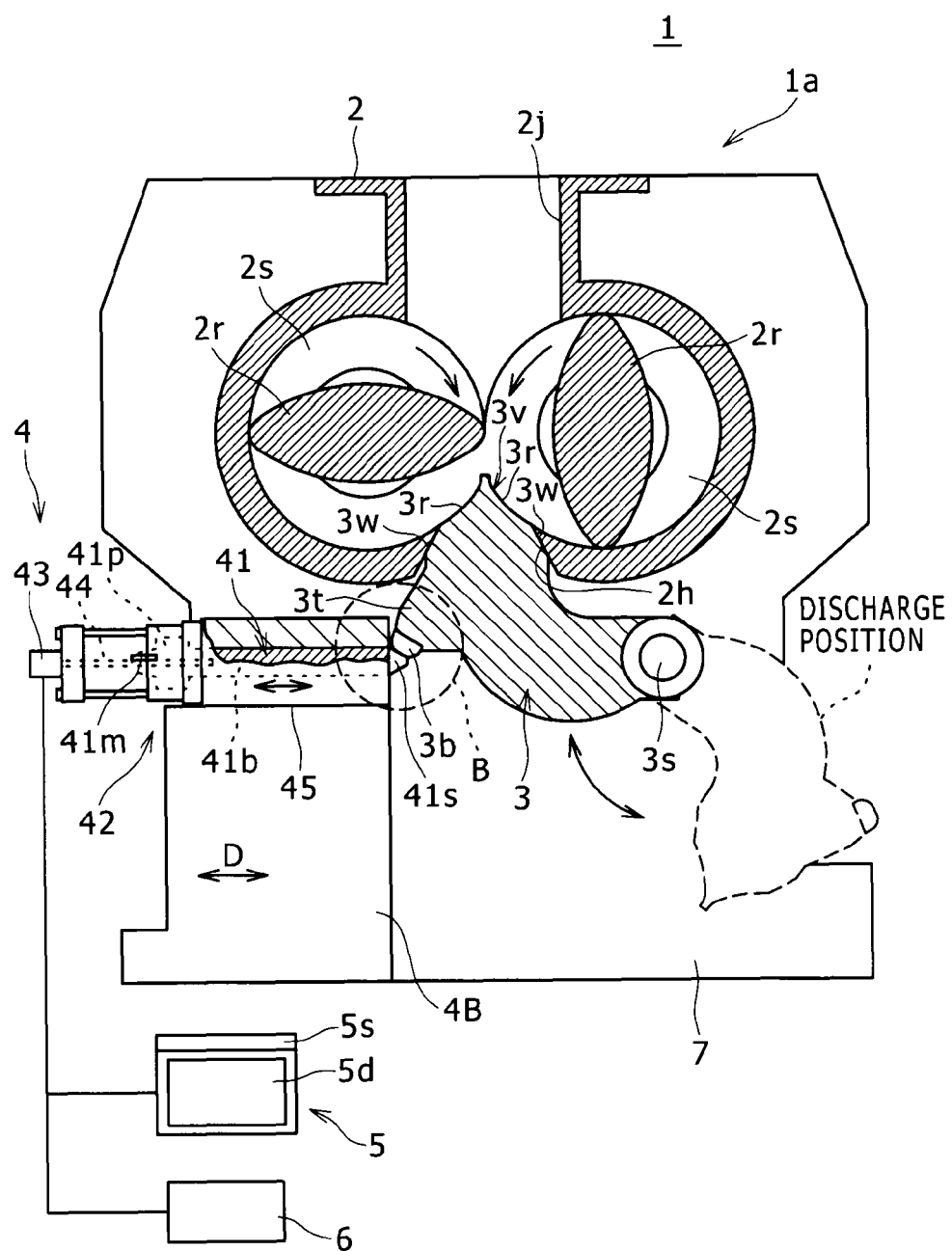
FIG. 1 is a front schematic view showing an overall structure of an internal batch mixer according to a first embodiment of the present invention.

Hereinafter, a first embodiment of the present invention will be described with reference to FIGS. 1 to 9.

(Overall Structure)

Firstly, an overall structure of an internal batch mixer 1 according to the first embodiment of the invention will be described with reference to FIG. 1.

The internal batch mixer 1 includes: a mixing device 1a for mixing material; a display device 5 for displaying displacement information of a latch member 41 and alarm (warning information) which will be described later; and a storage device 6 for storing a set value which will be described later.

The mixing device 1a includes a casing 2, two rotors 2r, a drop door 3, a latch mechanism 4, and a support base 7. The internal batch mixer 1 according to this embodiment is a two-shaft batch mixer, and is used, for example, for mixing of rubber raw material.

The material to be mixed is supplied into the casing 2 through a material feed opening 2j, which is formed in an upper portion of the casing 2, by a floating weight (not shown) provided within a hopper (not shown) so as to be capable of rising and lowering. The two rotors 2r formed of a metallic material are disposed within the casing 2. The two rotors 2r are mixing rotors, which are rotated in mutually different directions by receiving a power from a motor not shown (refer to the directions of arrows in FIG. 1). The material is mixed within the casing 2 by this rotation of the two rotors 2r.

The mixed material is discharged through a material discharge opening 2h formed in a lower portion of the casing 2. When the material is discharged, the material discharge opening 2h is opened by the drop door 3 rotating downward to a discharge position shown by the broken line in FIG. 1, whereby the material can be discharged out of the casing 2.

During the mixing operation, the drop door 3 is put into a latched state by the function of the latch mechanism 4. In the latched state, the drop door 3 blocks the material discharge opening 2h and cannot be opened. When the material is discharged, the latch mechanism releases the latched state, whereby the drop door 3 becomes openable.

The internal batch mixer 1 of this embodiment is configured so that display of displacement information of the latch member 41 (to be described later) and alarm display can be performed by the display device 5. Hereinafter, each component will be described in detail.

(Casing)

The casing 2, that is a body part of the internal batch mixer 1, is composed of a metallic material. The casing 2 is supported by the support base 7 made of metal. Two mixing chambers 2s are formed inside the casing 2. Each of the mixing chambers 2s is formed in a substantially columnar shape, and laterally juxtaposed as shown in FIG. 1 while extending in parallel to each other. Each rotor 2r is disposed within each mixing chamber 2s so as to extend in the same direction as the mixing chamber 2s. As described above, the material feed opening 2j for supplying the material to be mixed is formed at an upper portion of the casing 2. The material discharge opening 2h for discharging the material which has been mixed is formed at a lower portion of the casing 2. The material discharge opening 2h is formed to extend along the axial direction of the rotor 2r. In the casing 2, the material feed opening 2j, the two mixing chambers 2s and the material discharge opening 2h communicate with each other.

(Drop Door)

The drop door 3 is formed of a metallic material, and functions as a lid member for blocking the material discharge opening 2h of the casing 2. This drop door 3 falls into the concept of the door in the present invention. The drop door 3 is provided to be rotatable around a rotary shaft 3s. Concretely, the rotary shaft 3s is fixed to the drop door 3. The rotary shaft 3s is supported by the support base 7 in a rotatable state. The axial direction of the rotary shaft 3s is parallel to the axial direction of the rotor 2r. The drop door 3 opens and closes the material discharge opening 2h by rotating around the rotary shaft 3s, and blocks the material discharge opening 2h when it is in a closed state. The rotary shaft 3s falls into the concept of the shaft in the present invention.

The drop door 3 includes a tip section 3v and a projecting portion 3t. The tip section 3v is provided to protrude to the inside of the casing 2 in a state where the drop door 3 blocks the material discharge opening 2h. The tip section 3v is formed to extend along the axial direction of the rotor 2r. In a closed state of the drop door 3, or in a state in which the drop door 3 blocks the material discharge opening 2h, the tip section 3v enters to the inside of the material discharge opening 2h. In this state, two surfaces 3r facing the two rotors 2r of the tip section 3v, or the surfaces 3r at both lateral sides of the tip section 3v in FIG. 1 constitute the wall surface of the two mixing chambers 2s together with the inner surface of the casing 2.

In the drop door 3, two contact surfaces 3w are formed below the two surfaces 3r. The two contact surfaces 3w contact with the inner wall surface of the material discharge opening 2h in the closed state of the drop door 3.

The projecting portion 3t is a part to contact with a contact portion 41s (latch member 41) provided on a piston rod 41b which will be described later. This projecting portion 3t is formed to protrude toward the contact portion 41s in the closed state of the drop door 3.

Figure 2:
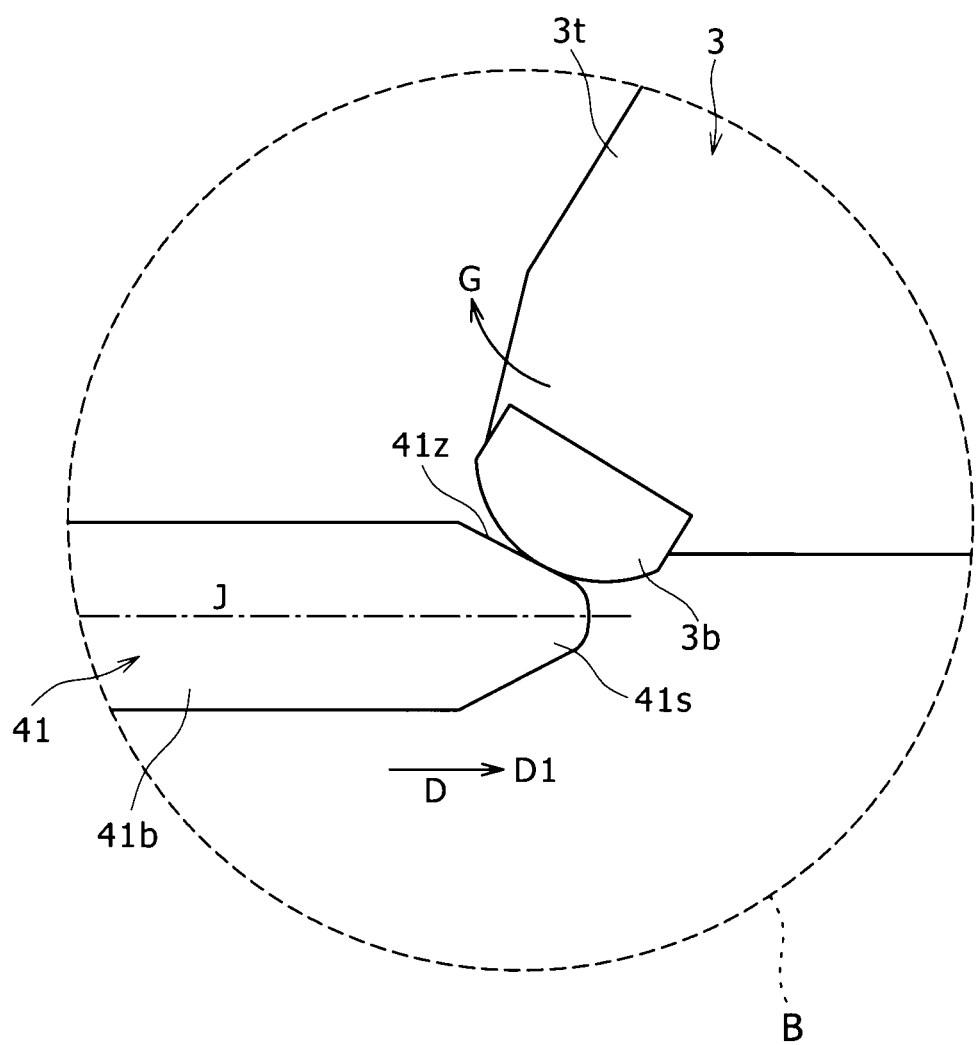
FIG. 2 is an enlarged schematic view of section B in FIG. 1.

The projecting portion 3t includes, as shown in FIGS. 1 and 2, a metallic contact plate 3b. The contact plate 3b of the projecting portion 3t contacts with the contact portion 41s. The contact plate 3b is disposed at the tip of the projecting portion 3t or at a part closest to the contact portion 41s of the projecting portion 3t. The surface of the contact plate 3b is formed in a curved shape, concretely, as a part of a spherical surface. The contact plate 3b is fixed to the body of the projecting portion 3t by use of a bolt not shown. Namely, the contact plate 3b is attachable and detachable. The contact plate 3b may be made of synthetic resin. Otherwise, the contact plate 3b may be omitted.

(Latch Mechanism)

A latch mechanism 4 holds, during mixing operation, the drop door 3 in a latched state, that is, a state in which the latch member 41 presses the drop door 3 onto the casing 2 so that the drop door 3 blocks the material discharge opening 2h and cannot be opened. On the other hand, the latch mechanism 4 releases the latched state of the drop door 3 when the material mixed within the casing 2 is discharged out of the casing 2.

The latch mechanism 4 includes the latch member 41, a hydraulic cylinder 42, and a linear sensor 43. The hydraulic cylinder 42 falls into the concept of the linear actuator in the present invention. This hydraulic cylinder 42 includes a piston rod 41b, a piston 41p and a cylindrical body 45. The piston rod 41b is inserted into the cylindrical body 45. The piston 41p is set inside the cylindrical body 45.

The cylindrical body 45 functions as a support for the whole hydraulic cylinder 42 and also guides the piston 41p and the piston rod 41b along the axial direction thereof. The cylindrical body 45 is fixed to a base 4B. The base 4B is formed integrally with the support base 7. Namely, the hydraulic cylinder 42 is positionally fixed so as not to move relative to the position of the casing 2. The hydraulic cylinder 42 and the support base 7 only need to be set on the same base, and the base 4B and the support base 7 may be composed of separated different members.

The piston rod 41b is a bar-like member. The piston 41p is attached to the piston rod 41b inside the cylindrical body 45. The piston 41p and the piston rod 41b fall into the concept of the moving part in the present invention. The piston 41p is formed in an annular shape, and fixed while being fitted onto the piston rod 41b. The piston 41p and the piston rod 41b are mutually attachable and detachable. The piston rod 41b and the piston 41p may be formed as an integrated unit.

The latch member 41 is provided to be contactable with the contact plate 3b of the drop door 3. In this embodiment, the latch member 41 corresponds to a tip section of the piston rod 41b, or the contact portion 41s provided integrally at an end close to the drop door 3 of the piston rod 41b (refer to FIGS. 1 and 2). The contact portion 41s is protruded in a tapered shape along the axial direction of the piston rod 41b. In the contact portion 41s, the diameter of a section vertical to axial direction D is reduced toward the end close to the drop door 3. The side surface of the contact portion 41s is formed in a conical shape, and the surface of the tip of the contact portion 41s is formed as a curved surface constituting a part of a spherical surface. An inclined portion 41z is formed on the upper surface of the contact portion 41s. The inclined portion 41z is inclined so that the distance from a center line along the axial direction D (refer to the dashed line J of FIG. 2) is reduced toward the tip surface of the contact portion 41s.

The piston rod 41b is a replacement part. If the contact portion 41s wears down by contact with the contact plate 3b, only the piston rod 41b can be replaced by a new part. The latch member may be a member provided separately from the linear actuator as in a second embodiment which will be described later.

The hydraulic cylinder 42 supplies power to the contact portion 41s to direct the contact portion 41s to the drop door 3 by moving the piston 41b and the piston rod 41b toward the drop door 3 with use of hydraulic pressure. Concretely, a hydraulic circuit not shown is connected to the hydraulic cylinder 42. Hydraulic oil is supplied from the hydraulic circuit to hydraulic chambers formed on both sides across the piston 41b within the hydraulic cylinder 42. When the drop door 3 is put into the latched state by moving the latch member 41 (contact portion 41s) toward the drop door 3, the hydraulic oil is supplied to the hydraulic chamber (head-side chamber) on the left side of the piston 41p in FIG. 1. When the latched state is released, the hydraulic oil is supplied to the hydraulic chamber (rod-side chamber) on the right side of the piston 41p in FIG. 1. The piston rod 41b and the piston 41p reciprocate along the axial direction of the piston rod 41b (the direction of arrow D in FIG. 1). Namely, the piston rod 41b and the piston 41b linearly move in the approaching and separating directions relative to the drop door 3.

A permanent magnet 41m is attached to an end on the inner side of the hydraulic cylinder 42 of the piston rod 41b, or an end located oppositely to the drop door 3 of the piston rod 41b. The permanent magnet 41m may be attached not to the piston rod 41b but to the piston 41p.

A magnetostrictive wire (sensor probe) 44 is disposed inside the hydraulic cylinder 42. The magnetostrictive wire 44 is positionally fixed relative to the cylindrical body 45 of the hydraulic cylinder 42. The magnetostrictive wire 44 extends along the axial direction D of the piston rod 41b. A guide hole is formed at the center of the piston rod 41b to extend along the axial direction D. The magnetostrictive wire 44 is inserted into this guide hole. The stroke operation of the piston rod 41b is performed in this state. Namely, the position of the permanent magnet 41m is changed relative to the positionally-fixed magnetostrictive wire 44 during the stroke movement of the piston 41b of the hydraulic cylinder 42. The magnetostrictive wire 44 is a metallic wire composed of nickel alloy. As the material of the magnetostrictive wire, any metallic material (ferromagnetic material) which can develop the Wiedemann effect may be adopted. For example, the magnetostrictive wire 44 may be composed of an alloy containing iron, cobalt, gadolinium, or the like.

The linear sensor 43 measures distance of linear movement of the piston rod 41b by the hydraulic cylinder 42, in other words, distance of linear movement along the axial direction D of the piston rod 41b. The distance of linear movement of the piston rod 41b with the drop door 3 being in the latched state, or a maximum value of linear movement distance of the piston rod 41b corresponds to the stroke of the hydraulic cylinder 42. This stroke of the hydraulic cylinder 42 is the travel distance of the piston 41b from one end to the other end of the cylindrical body 45 in the closed state of the drop door 3. In other words, the "stroke" of the hydraulic cylinder 42 is, when explained with FIG. 1, the travel distance of the piston rod 41b from the left end (one end) to the right end (the other end: the position in the latched state).

The linear sensor 43 is electrically connected to the magnetostrictive wire 44. The linear sensor 43 is integrally attached to a head-side end of the hydraulic cylinder 42, or an end opposite to the drop door 3 of the cylindrical body 45 of the hydraulic cylinder 42. The integral attachment of the linear sensor 43 to the cylindrical body 45 of the hydraulic cylinder 42 eliminates the risk of displacement of the linear sensor 43 during the operation of the mixer.

Next, the principle of the above-mentioned measurement of linear movement distance by the linear sensor 43 will be described with reference to FIG. 3.

Current (current pulse) is flown through the magnetostrictive wire 44. This current flows in the direction of arrow A from the start end side of the magnetostrictive wire 44 (linear sensor 43 side). At this time, a magnetic field is produced in the magnetostrictive wire 44 along the circumferential direction.

Figure 3:
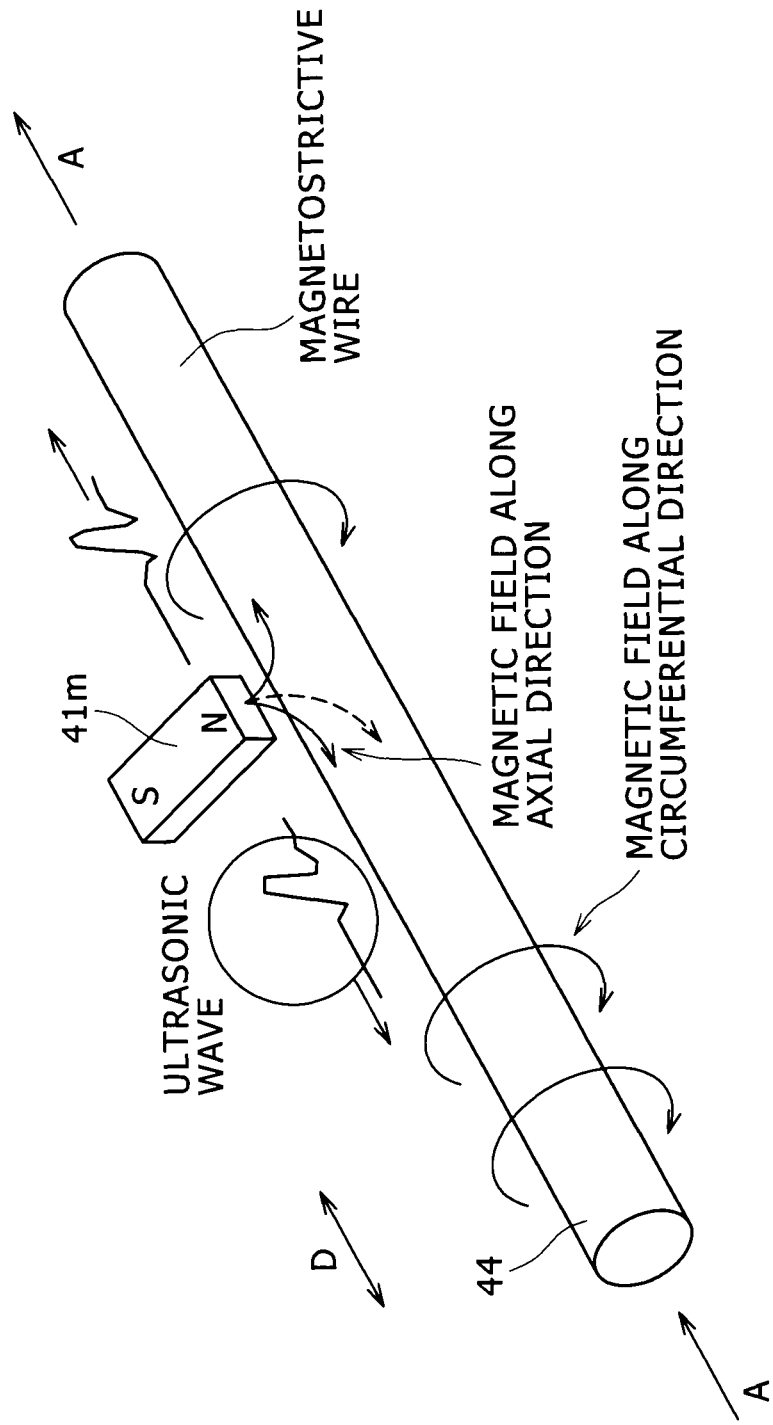
FIG. 3 is a perspective schematic view for illustrating the operating principle of a linear sensor.

The permanent magnet 41m of the piston rod 41b has a positional relation with the magnetostrictive wire 44 as shown in FIG. 3. In the vicinity of the permanent magnet 41m, a magnetic field is produced along the axial direction D. When the permanent magnet 41m gets close to the magnetostrictive wire 44, an oblique magnetic field as shown by the dotted line is produced, around a position near the permanent magnet 41m of the magnetostrictive wire 44, by the composition of the magnetic field along the circumferential direction and the magnetic field along the axial direction D. This oblique magnetic field causes torsional distortion at a part near the permanent magnet 41m of the magnetostrictive wire 44. This phenomenon is called the Wiedemann effect. The above-mentioned torsional distortion propagates on the magnetostrictive wire 44 composed of metal as ultrasonic oscillation or sonic signal. The linear sensor 43 specifies the position of the permanent magnet 41*m* by measuring the propagation time of this ultrasonic wave or sonic wave.

An output signal from the linear sensor 43 or a signal showing a position of the permanent magnet 41*m* is input to a counter (not shown) through an A/D converter (not shown). This signal is processed by the counter, whereby a numerical value representing the distance of linear movement of the piston 41*p* in the hydraulic cylinder 42 is derived. Output current from the linear sensor 43 is 4 to 20 mA. The linear sensor 43 may be connected to a programmable controller, a microprocessor, etc. through the A/D converter. In this case, the piston rod 41*b* can be decelerated and stopped at an optional position.

(Display Device)

The display device 5, that is a liquid crystal display, is provided on a control panel (not shown) disposed at a position near and outside the mixing device 1*a*. The display device 5 includes a display 5*d* that is a display screen. Various pieces of information are displayed on this display 5*d*.

The display device 5 displays a variation in stroke of the hydraulic cylinder 42 as displacement information of the latch member 41, as shown in FIGS. 4 to 9, based on the distance of linear movement measured by the linear sensor 43. The display device 5 functions also as an alarm device as described later. The display device and the alarm device may be constituted as different devices.

The display device 5 includes a central processing unit (CPU) 5*s*. The central processing unit 5*s* has a controller and an arithmetic device, and is electrically connected to the storage device 6 and the linear sensor 43. The central processing unit 5*s* performs arithmetic processing to compare displacement information of the latch member 41 with a set value stored in the storage device 6. Concretely, the central processing unit 5*s* performs arithmetic processing to compare a measurement value by the linear sensor 43 in a state in which the drop door 3 is held in the latched state by the latch mechanism 4, or the stroke of the hydraulic cylinder 42, with the set value stored in the storage device 6. The central processing unit 5*s* performs control processing to instruct the display 5*d* to perform an alarm display when the measurement value by the linear sensor 43 reaches the set value.

(Storage Device)

The storage device 6, that is a RAM (Random Access Memory), is provided within the above-mentioned control panel. The storage device 6 preliminarily stores a plurality of set values regarding the displacement information of the latch member 41. The "set value" means a value which is set as a value corresponding to the stroke of the hydraulic cylinder 42 or the maximum value of linear movement distance of the piston rod 41*b*, and used as a reference value for alarm display which will be described later.

The storage device 6 is configured so that a plurality of stages of the set value can be set. Namely, the storage device 6 can store a plurality of stroke values as the set value. With respect to input of the set value to the storage device 6, the operator can input an optional set value by use of a keyboard provided on the control panel, or a maker-recommended set value can be preliminarily stored in the storage device 6. The storage device 6 may store only one set value.

The storage device 6 further stores wear status monitoring software. This software (program) causes the internal batch mixer 1 to execute a measuring step, a display step and an alarm step.

(Latched State)

Next, the latched state will be described. The latched state means a state in which the drop door 3 is locked by the latch mechanism 4 so as not to be opened while blocking the material discharge opening 2*h* of the casing 2.

The piston rod 41*b* is initially housed inside the cylindrical body 45 by being located closer to the left end within the cylindrical body 45, and the contact portion 41*s* is not protruded out of the cylindrical body 45. In this state, the drop door 3 can freely rotate around the rotary shaft 3*s* without contact to the contact portion 41*s*.

When the drop door 3 is rotated upwardly from a discharge position to insert the tip section 3*v* into the material discharge opening 2*h*, the drop door 3 is put into a closed state, and the material discharge opening 2*h* is blocked by the drop door 3.

The latch mechanism 4 is operated with the drop door 3 being closed, whereby the drop door 3 is held in the latched state. Concretely, hydraulic pressure on the head chamber side acts on the piston 41*p* of the hydraulic cylinder 42 at this time, whereby force directed to the drop door 3 (the direction of arrow D1 in FIG. 2) is given the piston 41*p* and the piston rod 41*b*. Along with this, force directed to the drop door 3 is also given to the contact portion 41*s*. The inclined portion 41*z* provided above the contact portion 41*s* contacts with the contact plate 3*b* of the drop door 3 as shown in FIGS. 1 and 2. In this state, the force directed to the drop door 3 of the contact portion 41*s* acts on the contact plate 3*b*.

The contact portion 41*s* advances to the lower side of the contact plate 3*b*. At this time, force in an uplifting direction (the direction of arrow G in FIG. 2) is given from the inclined portion 41*z* of the contact portion 41*s* to the projecting portion 3*t* of the drop door 3. As a result, two contact surfaces 3*w* of the drop door 3 are pressed onto the inner wall surface of the material discharge opening 2*h* (refer to FIG. 1). The drop door 3 is supported upwardly by the contact portion 41*s* so as not to be opened.

As described above, in the latched state, the drop door 3 is latched by the latch mechanism 4, and the drop door 3 is locked so as not to be opened while blocking the material discharge opening 2*h*, whereby the air-tightness of the mixing chamber 2*s* is maintained.

In this embodiment, the contact plate 3*b* is provided at the part of the drop door 3, which contacts with the contact portion 41*s*, as described above. The contact plate 3*b* and the piston rod 41*b* provided with the contact portion 41*s* are consumable parts and also replacement parts. Namely, the contact plate 3*b* and the contact portion 41*s* contact with each other and wear down with repeated opening and closing operations of the drop door 3. In other words, the contact plate 3*b* and the piston rod 41*b* provided with the contact portion 41*s* are wearing members.

(Alarm Display)

The display device 5 functions also as an alarm device which gives an alarm. Hereinafter, the display of displacement information of the latch member 41 and alarm display by the display device 5 will be described. The storage device 6 stores two set values as a reference value for the stroke of the hydraulic cylinder 42 or for the maximum value of linear movement distance of the piston rod 41*b*. Concretely, the set values are set for two stages of "52.0 mm" (set value A) and "53.0 mm" (set value B). These two stages of set values are set relative to one linear sensor 43.

The set value A is a reference value for replacement time of wearing member, which is recommended by a maker. Replacement of wearing member is performed when the value of stroke of the hydraulic cylinder 42 reaches the set value A, whereby the internal batch mixer 1 can be further surely and safely operated. The set value B is a reference value representing an application limit of wearing member. If the operation of the internal batch mixer 1 is stopped when the value of stroke of the hydraulic cylinder 42 reaches the set value B, the internal batch mixer 1 can be prevented from being seriously damaged. The value and setting method for the set value are not limited to those described above.

For example, if the stroke of the hydraulic cylinder 42 is 50 mm before occurrence of wear in a wearing member, or in use of a new wearing member, stroke variation is a variation in stroke of the hydraulic cylinder 42 from this numeral value. The display device 5 can display the stroke variation (displacement information of the latch member 41) in a plurality of display modes shown below. The display mode of the stroke variation by the display device 5 can be changed by operation on the control panel.

Figure 4:
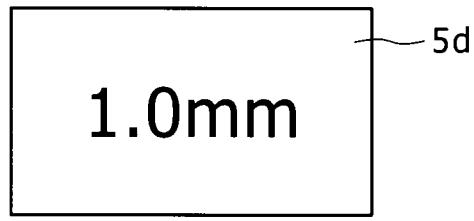
FIG. 4 is a schematic view showing a first display mode in a display device.

In a first display mode, the display device 5 numerically displays, as shown in FIG. 4, a current stroke variation on the display 5d. The indication of "1.0 mm" on the display 5d shows that the variation relative to the initial stroke before the wearing member wears down is +1.0 mm. Namely, in this state, the stroke of the hydraulic cylinder 42 is increased by 1.0 mm by the abrasion between the contact plate 3b and the contact portion 41s that are contact parts, or the stork is 51.0 mm. The stroke does not reach the set value yet in this state.

Figure 5:
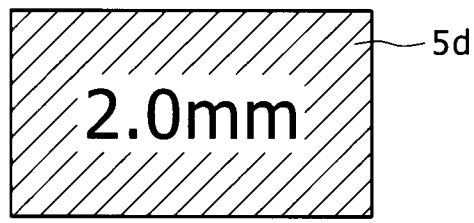
FIG. 5 is a schematic view showing the first display mode in the display device.

When the stroke variation reaches +2.0 mm, or when the stroke reaches 52.0 mm (set value A), the background color of the display 5d changes to a darker color as shown in FIG. 5. In other words, the background color of the display 5d changes so as to reduce the brightness. This change in background color of the display 5d is a preliminary alarm.

Figure 6:
FIG. 6 is a schematic view showing the first display mode in the display device.

When the stroke variation reaches +3.0 mm, or when the stroke reaches 53.0 mm (set value B), the background color of the display 5d changes to a further darker color as shown in FIG. 6. This change in background color of the display 5d is a second-stage alarm.

As described above, the display device 5 changes the background color of the display 5d among three stages for each stroke variation (unit: mm) of the following three ranges (i), (ii), and (iii).
  (i) 0.0 to +1.9
  (ii)+2.0 to +2.9
  (iii)+3.0 or more In this first display mode, "the change in the background color of the display 5d from the state of FIG. 4 when the measurement value by the linear sensor 43 in the latched state reaches the set value" corresponds to an alarm (alarm display). Namely, in this display mode, the alarm is displayed in the display device 5. In this display mode, also, the change in the display mode of displacement information of the latch member 41 in the display device 5 functions as the alarm.

Figure 7:
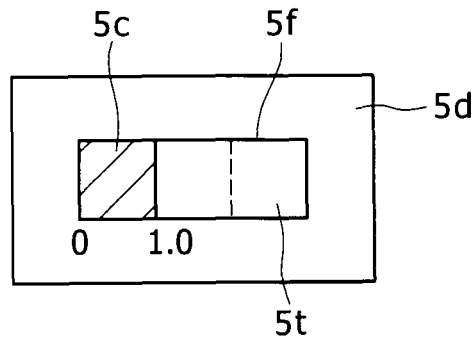
FIG. 7 is a schematic view showing a second display mode in the display device.
Figure 8:
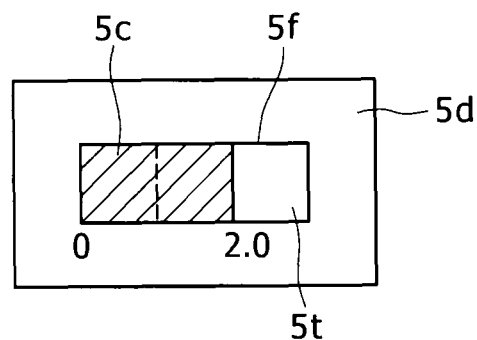
FIG. 8 is a schematic view showing the second display mode in the display device.
Figure 9:
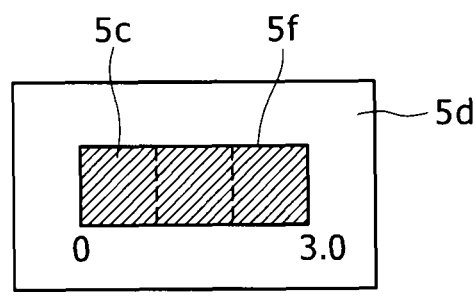
FIG. 9 is a schematic view showing the second display mode in the display device.

Next, a second display mode is described. In this second display mode, the stroke variation is graphically displayed. Concretely, the stroke variation is displayed by bar chart, and the area of a colored section 5c showing the stroke variation increases as the value of the stroke variation increases as shown in FIGS. 7, 8 and 9. At an initial point of time before occurrence of wear on the wearing member, or when the stroke variation is 0, the inside of a frame 5f is not colored. The area of the colored section 5c increases within the frame 5f displayed on the display 5d. The fully colored frame 5f shows that the stroke has reached the set value B. As the area of the colored section 5c increases, the area of a non-colored section 5t within the frame 5f decreases.

FIG. 7 shows a screen of the display 5d when the stroke variation is +1.0 mm, or when the stroke is 51.0 mm. In this state, the stroke variation is displayed as the colored section 5c by bar chart in the display 5d.

When the stroke variation reaches +2.0 mm, or when the stroke reaches 52.0 mm (set value A), the right end position of the colored section 5c reaches a position indicating 2.0 mm. In this state, the color of the colored section 5c changes to a darker color as shown in FIG. 8. In other words, the color of the colored section 5c changes so as to reduce the brightness. This change in color of the colored section 5c is a preliminary alarm.

When the stroke variation reaches +3.0 mm, or when the stroke reaches 53.0 mm (set value B), the color of the colored section 5c changes to a further darker color as shown in FIG. 9. This change in color of the colored section 5c is a second-stage alarm. In this state, the inside of the frame 5f is entirely composed of the colored section 5c.

Also in this second display mode, "the change in the color of the colored section 5c from the state of FIG. 7 when the measurement value by the linear sensor 43 in the latched state reaches the set value" corresponds to the alarm (alarm display). Namely, also in this display mode, the alarm is displayed on the display device 5. Further, also in this display mode, the change in the display mode of displacement information of the latch member 41 in the display device 5 functions as the alarm.

In this embodiment, the value corresponding to the stroke of the hydraulic cylinder 42 in the latched state is adopted as the set value to be stored in the storage device 6, and the display device 5 compares the set value with the measurement value by the linear sensor 43 in the latched state. Without being limited to such a form, however, a value corresponding to the stroke variation of the hydraulic cylinder 42 in the latched state or an indicated value of the display device 5, for example, may be adopted as the set value to be stored in the storage device 6, and the display device 5 may compare this set value with a stroke variation obtained from the measurement value by the linear sensor 43. In this case, the displacement information of the latch member 41 is the stroke variation. When explained with the above-mentioned example, the set value A is "2.0 mm" and the set value B is "3.0 mm". The display device compares such a set value with the "stroke variation" that is the indicated value.

(Monitoring Method)

The monitoring method of the internal batch mixer according to this embodiment will be then described.

The material discharge opening 2h is blocked with the drop door 3 by closing the drop door 3 (door closing step). The latch mechanism 4 is operated so that the contact portion 41s supports the contact plate 3b upwardly, whereby the lowering of the drop door 3 is restricted, and the drop door 3 is put into the latched state in which the drop door 3 cannot be opened (latch step).

The distance of linear movement of the piston rod 41b by the hydraulic cylinder 42 is measured by the linear sensor 43 (measuring step). This step is constantly repeated during the operation of the internal batch mixer 1. The measuring step does not have to be constantly performed. Namely, the measuring step may be performed only when needed.

Next, the stroke variation of the hydraulic cylinder 42 as the displacement information of the latch member 41 is displayed in the display device 5 based on the distance of linear movement of the piston rod 41b measured by the linear sensor 43 (display step). The display step is performed for each execution of the measuring step in a state where the drop door 3 is held in the latched state. Therefore, a current value of the stroke variation is constantly displayed in the display device 5 during the operation of the internal batch mixer 1. The display step may be performed only when needed.

The display device 5 compares the measurement value of linear movement distance of the piston rod 41b in the latched state with the set value (set values A and B), and performs the alarm display when the measurement value reaches the set value (alarm step). This alarm step of performing the comparison of the measurement value with the set value and the alarm display is constantly repeated during the operation of the internal batch mixer 1.

In the internal batch mixer 1, as descried above, the stroke of the hydraulic cylinder 42 can be confirmed from an electric signal output from the linear sensor 43. The operator can grasp a wear status for wearing member by watching the display device 5 while operating the internal batch mixer 1 to perform the mixing operation of material. The operator can stop the operation of the internal batch mixer 1 as needed by monitoring the display of the display device 5. The operation of the internal batch mixer can be automatically stopped when the measurement value by the linear sensor 43 reaches the set value A or the set value B.

(Effect)

The effects obtained by the internal batch mixer 1 according to this embodiment and the monitoring method thereof will be then described.

(1) The internal batch mixer 1 includes the mixing device 1a for mixing material, and the display device 5 provided outside the mixing device 1a. The mixing device 1a includes: the casing 2 within which the material is mixed and which has the material discharge opening 2h for discharging the material which has been mixed; the drop door 3 which opens and closes the material discharge opening 2h by rotating around the rotary shaft 3s, and blocks the material discharge opening 2h when it is in a closed state; and the latch mechanism 4 which holds, during mixing of the material within the casing 2, the drop door 3 in a latched state, that is a state such the latch mechanism 4 presses the drop door 3 onto the casing 2 so that the drop door 3 blocks the material discharge opening 2h and cannot be opened, and releases the latched state when discharging the material mixed within the casing 2 out of the casing 2. The latch mechanism 4 includes the hydraulic cylinder 42 which includes the contact portion 41s (latch member 41) provided to be contactable with the drop door 3; and the piston 41p and piston rod 41b which are linearly movable, the hydraulic cylinder supplying power to the contact portion 41s to direct the contact portion 41s to the drop door 3 side by moving the piston 41p and piston rod 41b toward the drop door 3; and the linear sensor 43 which measures distance of linear movement of the piston rod 41b by the hydraulic cylinder 42, and the display device 5 displays, based on a measurement value of linear movement distance of the piston rod 41b measured by the linear sensor 43, a stroke variation as displacement information of the latch member 41.

In this structure, the display device 5 provided outside the mixing device 1a can display displacement information of the latch member 41 that is a position or variation in position of the latch member 41 (contact portion 41s) based on the measurement value of linear movement distance of the piston rod 41b by the linear sensor 43. In this embodiment, the display device 5 outside the mixing device 1a can display information about the stroke of the hydraulic cylinder 42, that is, the stroke or variation in stroke of the hydraulic cylinder 42. Therefore, the operator can easily grasp information about the wear status of contact portions of the drop door 3 and the latch member 41, or the contact plate 3b and the contact portion 41s, by viewing the displacement information of the latch member 41 during the operation of the mixer. Since the operator can confirm the wear status of the contact portions during the operation of the mixer, he/she can know the replacement time of wearing member. The operator further can prevent deformation of an edge portion of the casing 2 forming the material discharge opening 2h, the deformation being caused by continuous use of a member beyond its application limit, by monitoring the wear status of the contact portions.

(2) The internal batch mixer 1 also includes the storage device 6 which stores a plurality of set values (set value A and set value B) regarding the displacement information of the latch member 41, and the display device 5 which compares a measurement value of linear movement distance of the piston rod 41b in the latched state with each set value, and gives an alarm when the measurement value in the latched state reaches the set value.

In this structure, since the alarm is given when the measurement value of linear movement distance in the latched state as latch member displacement information based on the measurement value by the linear sensor 43 reaches an optional set value stored in the storage device 6, or a reference value for replacement time or application limit of wearing member, the wear status of wearing member can be further surely grasped.

(3) In the internal batch mixer 1, further, the storage device 6 is configured so that at least two stages of set value can be stored for one linear sensor 43. In this structure, two or more set values are set as a reference value corresponding to the measurement value by the linear sensor 43, whereby the wear status of wearing member can be monitored stepwise. Concretely, in this embodiment, the display device 5 can give a preliminary alarm to announce the coming of the replacement time of wearing member and also an alarm to announce the coming of the wearing limit (application limit) of wearing member. Accordingly, since continuous use of a worn wearing member can be prevented, a force can be prevented from acting on the thinned portion at the opening edge of the material discharge opening 2h beyond its durability limit. As a result, machine components can be protected. Further, securement of a preparation period for wearing members that are consumable parts, work planning for replacement of wearing members, or the like can be efficiently performed.

(4) In the internal batch mixer 1, the display device 5 doubles as an alarm device, and the display device 5 has the function of displaying the alarm. According to this structure, since the alarm is displayed in the display device 5 which displays the latch member displacement information, the operator can visually confirm both the latch member displacement information and the alarm. Therefore, the operator can easily perform grasp of the wear status of wearing member and check for whether the wear status is at the level of the replacement time or application limit of wearing member.

(5) In the internal batch mixer 1, the display device 5 performs the alarm display by changing the display mode of the displacement information of the latch member 41. Since the operator can visually and simultaneously confirm the latch member displacement information and the alarm in this structure, the grasp of the wear status of wearing member and the check for whether the wear status is at the level of the replacement time or application limit of the wearing members can be easily and simultaneously performed.

(6) The monitoring method of the internal batch mixer 1 according to this embodiment is a method for monitoring the internal batch mixer 1 provided with the casing 2 having the material discharge opening 2h for discharging mixed material, the drop door 3 which is rotationally opened and closed around the rotary shaft 3s to block the material discharge opening 2h, and the latch mechanism which, in mixing operation, puts the drop door 3 into a latched state in which the latch mechanism presses the drop door 3 to the casing 2 so that the drop door 3 cannot be opened, and releases the latched state when discharging the mixed material. The latch mechanism 4 includes the contact portion 41s (latch member 41) which contacts with the drop door 3, and the hydraulic cylinder 42 which supplies power to the contact portion 41s to direct the contact portion 41s to the drop door 3 side. This monitoring method includes: a measuring step of causing the linear sensor 43 to measure distance of linear movement of the piston rod 41b by the hydraulic cylinder 42; and a display step of causing, based on a measurement value of linear movement distance by the linear sensor 43, a display device 5 provided outside the mixing device 1a to display a stroke variation of the hydraulic cylinder 42 as displacement information of the latch member 41.

In this structure, information about the stroke of the hydraulic cylinder 42 as the displacement information of the latch member 41 is displayed on the display device 5 provided outside the mixing device 1a, based on the measurement value of linear movement distance of the piston rod 41b by the linear sensor 43. Therefore, the operator can easily grasp a wear status for contact portions of the drop door 3 and the latch member 41 (the contact plate 3b and the contact portion 41s) from the displacement information of the latch member 41 which is displayed in the display device 5 during the operation of the mixer. The operator also can know the replacement time of wearing member since he/she can confirm the wear status for the contact portions during the operation of the mixer. The operator can further prevent deformation of an edge portion forming the material discharge opening 2h of the casing 2, the deformation being caused by continuous use of the wearing members beyond the application limit, by monitoring the wear status of the contact portions.

(7) The monitoring method of the internal batch mixer according to this embodiment further includes an alarm step in which the display device 5 which doubles as an alarm device compares a measurement value by the linear sensor 43 in the latched state, or the distance of linear movement of the piston rod 41b of the hydraulic cylinder 42 in the latched state with a plurality of preset set values (set value A and set value B), and gives an alarm when the measurement value reaches each set value.

In this structure, since the alarm is given when the value of linear movement distance in the latched state based on the measurement value by the linear sensor 43 reaches each set value that is a reference value corresponding to the replacement time or application limit of wearing member, the wear status of wearing member can be further surely grasped.

According to the thus-constituted internal batch mixer 1 and the monitoring method of the internal batch mixer 1, the operator can monitor the conditions of wearing members distant from the operation site of the internal batch mixer 1 without leaving the operation site. The operator also can confirm the stroke of the hydraulic cylinder 42 during the mixing operation of the internal batch mixer 1 without leaving the above-mentioned operation site.

The above-mentioned structure can dispense with, even in a case in which the wear status of wearing member cannot be viewed from the outside due to a dust collecting cover attached to the confirmation position of wearing member, the operation of detaching the dust collecting cover for confirmation of the wear status of wearing member. Further, the above-mentioned structure can remarkably improve, when the dust collecting cover is attached to the confirmation position, the work environment in the stroke confirming operation for the hydraulic cylinder 42.

The life of consumable part can be predicted by analyzing log data for the measurement value by the linear sensor 43. Concretely, the life of consumable part can be predicted by confirming the wear status of the consumable part from the log data obtained by use of software formed for log data analysis.

The measurement value by the linear sensor 43 can be easily stored as a log of the mixing machine 1 since the measurement value is electric signal data.

Further, the electric signal data of the measurement value by the linear sensor 43 facilitates display of the value of stroke variation of the hydraulic cylinder 42 or the value of stroke of the hydraulic cylinder 42 on an operation monitoring display or an operation display of a centralized control system, and recording of such a value as data.

In this embodiment, the contact plat 3b and the contact portion 41s that are wearing members can be easily and surely maintained. In this embodiment, further, missing of the replacement opportunity of consumable part (wearing member) can be eliminated since the wear status of wearing member can be easily and surely confirmed, and damages on the internal batch mixer 1 can be consequently suppressed.

In this embodiment, since the confirmation of the wear status of wearing member is performed by use of the linear sensor 43, scale readjustment operation after replacement of wearing member (consumable part) is dispensed with, differed from a conventional structure configured to confirm the wear status of wearing member by visually comparing a mark attached to a piston rod with the scale of a scale plate.

(Second Embodiment)

A second embodiment of the present invention will be described about differences from the above-mentioned embodiment, in reference to FIGS. 5 and 6. In this second embodiment, descriptions for the same parts as in the above-mentioned first embodiment are omitted by assigning the same reference numbers thereto in the drawings. Namely, the parts denoted by 101, 101a, 102, 102h, 102j, 102s 103, 103b, 103r, 103s, 103v, 103w, 104, 104B, 141b, 142 and 107 in FIGS. 5 and 6 correspond to the parts denoted by 1, 1a, 2, 2h, 2j, 2s, 3, 3b, 3r, 3s, 3v, 3w, 4, 4B, 41b, 42 and 7 in FIGS. 1 and 2 respectively.

In the second embodiment, a tip section 103v is formed on a drop door 103. The drop door 103 includes a metallic contact plate 103b as shown in FIGS. 5 and 6. The contact plate 103b is disposed so as to be the closest to a latch striker 141s, which will be described later, in a closed state of the drop door 103. An inclined surface 103z is formed at a lower portion of the contact plate 103b as shown in FIG. 6. The inclined surface 103z is inclined so that its height from the base increases gradually toward a hydraulic cylinder 142.

A latch mechanism 104 includes the hydraulic cylinder 142, the linear sensor 43, and a latch member 141. The hydraulic cylinder 142 falls into the concept of the linear actuator in the present invention. The hydraulic cylinder 142 includes a piston rod 141b, a piston not shown, and a cylindrical body 145. The piston rod 141b is inserted into the cylindrical body 145, and the piston is disposed inside the cylindrical body 145.

In an internal batch mixer 101 of the second embodiment, the hydraulic cylinder 142 is mounted on a base 104B in an intermediate trunnion support form. The hydraulic cylinder 142 is mounted on the base 104B through a rotary shaft 145s extending in a direction orthogonal to the axial direction of the piston rod 141b. Concretely, the rotary shaft 145s is fixed to the cylindrical body 145, and the rotary shaft 145s is rotatably supported by the base 104B. Namely, the hydraulic cylinder 142 can rotate around the rotary shaft 145s.

Figure 11:
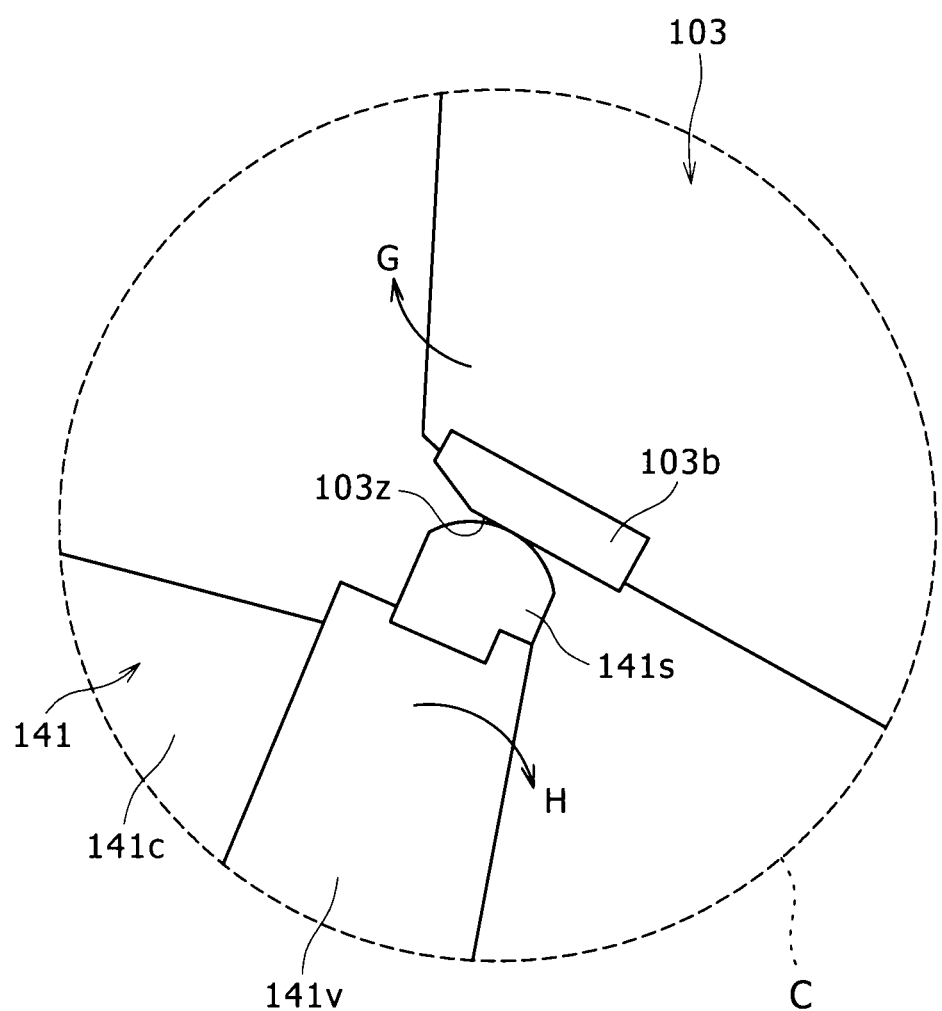
FIG. 11 is an enlarged schematic view of section C in FIG. 10.

The latch member 141 is a member contacting with the contact plate 103b of the drop door 103. The latch member 141 has a body section 141v, two flange sections 141c, and a latch striker 141s. The latch striker 141s is attached to an upper portion of the body section 141v to contact with the contact plate 103b. The surface of the latch striker 141s is formed into a curved surface. Concretely, the surface of the latch striker 141s is formed so as to constitute a part of the side surface of a cylinder disposed in parallel to the axial direction of the rotary shaft 103s (refer to FIG. 11). The latch striker 141s is fixed to the body section 141v by use of a bolt not shown.

Figure 10:
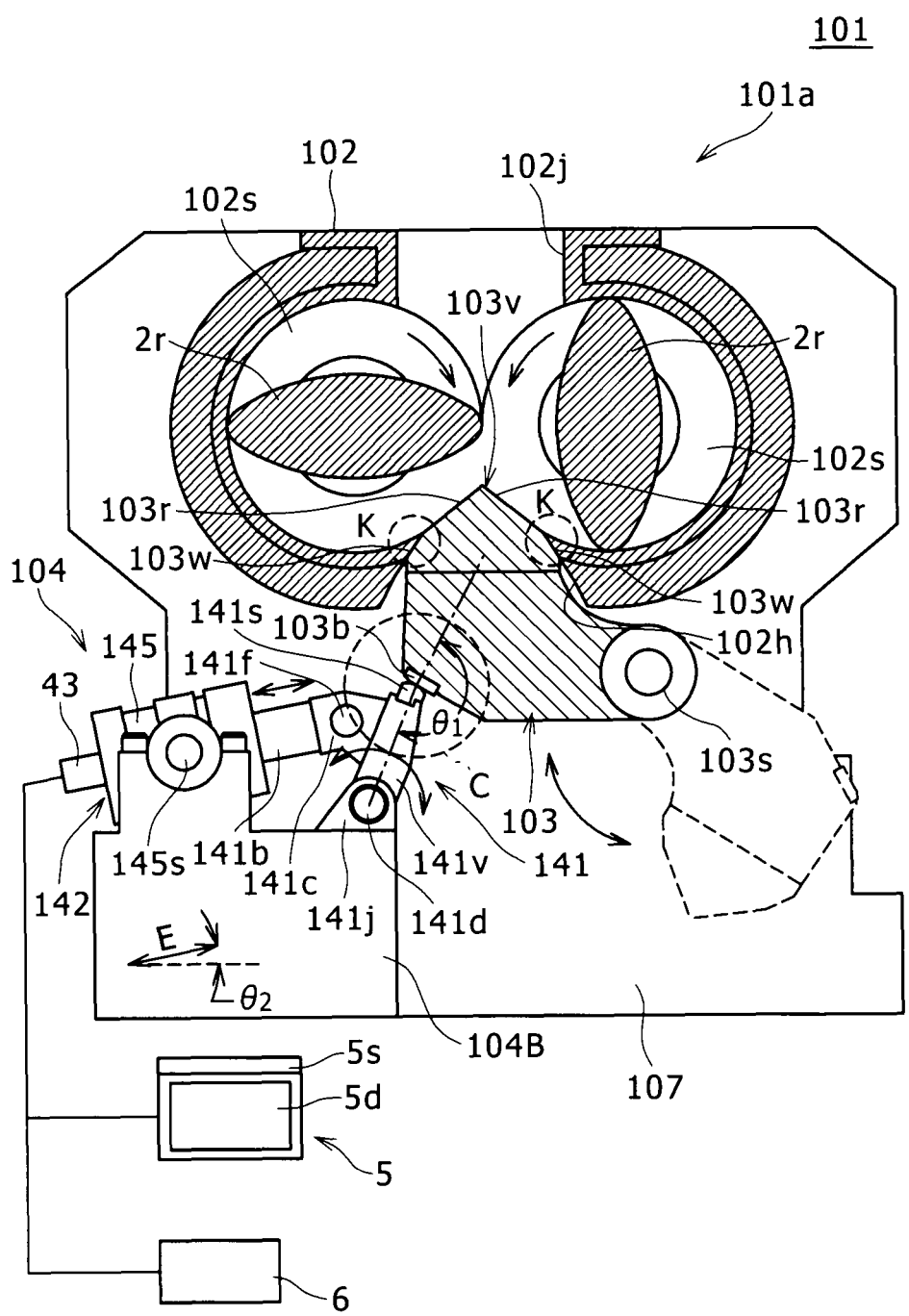
FIG. 10 is a front schematic view showing an overall structure of an internal batch mixer according to a second embodiment of the present invention.

The body section 141v is mounted on the base 104B through a rotary shaft 141d. The body section 141v can rotate around the rotary shaft 141d. Concretely, the body section 141v is held between two support flanges 141j provided on the base 104B, and the rotary shaft 141d extends through the two support flanges 141j and the body section 141v. In FIG. 10, only one support flange 141j of the two support flanges 141j is shown.

The two flange sections 141c extend from the body section 141v toward the hydraulic cylinder 142. The flange sections 141c are connected to the tip portion of the piston rod 141b by a rotary shaft 141f. This allows the body section 141v and the piston rod 141b to rotate relatively around the rotary shaft 141f. Concretely, the tip portion of the piston rod 141b is held between the two flange portions 141c, and the rotary shaft 141f extends through the two flange portions 141c and the tip portion of the piston rod 141b. In FIG. 10, only one flange portion 141c of the two flange portions 141c is shown.

In this way, the latch mechanism 104 has a toggle structure. Namely, in the latch mechanism 104, each member is mutually fixed and connected by use of three rotary shafts (the rotary shaft 145s, the rotary shaft 141d, and the rotary shaft 141f. The axial directions of the rotary shaft 145s, rotary shaft 141d, and rotary shaft 141f are parallel to the axial direction of the rotary shaft 103s.

In this embodiment, since the hydraulic cylinder 142 is rotatable around the rotary shaft 145s, the axial direction of the piston rod 141b or the reciprocating direction of the piston rod 141b is not settled in one fixed direction, differed from the above-mentioned first embodiment. Concretely, the angle formed by the direction of arrow E and the horizon in the state of FIG. 10 (refer to angle $\theta_2$ in FIG. 10) is reduced according to the abrasion between the latch striker 141s and the contact plate 103b, the direction of arrow E representing the axial direction of the piston rod 141b. Namely, according to the abrasion between the latch striker 141s and the contact plate 103b, the axial direction of the piston rod 141b gets close to the horizontal from the state of FIG. 10.

In the internal batch mixer 101, the drop door 103 is held in the latched state by operating the latch mechanism 104 with the drop door 103 being closed. Concretely, at this time, the piston rod 141b is moved toward the drop door 103 by the action of hydraulic pressure on the piston within the hydraulic cylinder 142 from the head chamber side, whereby a force in a direction of falling toward the drop door 3 (the direction of arrow H in FIG. 11) is given to the body section 141v, whereby the latch striker 14s advances to the lower side of the contact plate 103b. At this time, a force in a direction of moving upwardly from the latch striker 104s (the direction of arrow G in FIG. 11) is given to the contact plate 103b of the drop door 103. As a result, two contact surfaces 103w of the drop door 103 are pressed to an edge portion forming a material discharge opening 102h of a casing 102.

In this embodiment, the contact plate 103b and the latch striker 141s are consumable parts (replacement parts).

The internal structure of the hydraulic cylinder 142, the principle of magnet position detection by the linear sensor 143, and the display in the display device 5 in this embodiment are the same as in the above-mentioned first embodiment.

Further, in the toggle latch mechanism as described above, the force acting on the drop door 103 from the latch member 141 increases as the angle formed by the longitudinal direction of the body section 141v or a direction connecting the rotary shaft 141d to the latch striker 141s, and the normal at the contact point between the latch striker 141s and the contact plate 103b (angle $\theta_1$ in FIG. 1) gets close to 180°. In this case, the contact part of the casing 102 with the drop door 103, or the thinned portion at the edge forming the material discharge opening 102h of the casing 102 (the section K enclosed by the broken line in FIG. 10) is seriously deformed. In the internal batch mixer 101, such a damage on the casing 102 can be prevented by monitoring the wear statuses of the contact plate 103b and the latch striker 141s that are wearing parts.

In this embodiment, the piston rod 141b of the hydraulic cylinder 142 that is a linear actuator is provided as a member separate from the body section 141v (latch member 141), differed from the first embodiment.

(Other Embodiments)

The embodiment of the present invention in which the latch member of the latch mechanism contacts with the door is not limited to the first and second embodiments. For example, consumable parts (replacement parts) do not have to be provided in the contact area between the drop door and the latch member. Concretely, the contact plate 3b, 103b provided in the drop door 3, 103 may be omitted, and the latch member may directly contact the body section of the drop door. The latch striker 141s provided in the latch member may be omitted, and the drop door may directly contact with the body section of the latch member. In such a case, the whole drop door and the whole latch member are replacement parts.

Although the contact portion 41s is formed integrally with the body of the piston rod in the latch member 41 of the first embodiment, the contact portion 41s may be composed of a different member separated from the body of the piston rod. In this case, the contact portion 41s and the body of the piston rod are mutually fixed by means of adhesive or screwing. The contact portion 41s is a latch member in this case, and the latch member is a member different from a linear actuator. In this case, the contact portion 41s is a replacement part.

In the vicinity of the mixing device, a personal computer may be arranged instead of the control panel. In this case, a display of the personal computer corresponds to the display device, and a hard disk in the body unit of the personal computer corresponds to the storage device. In this case, further, the central processing unit 5s of the above-mentioned display device 5 corresponds to a CPU within the personal computer. The display device, the storage device or the alarm device may be in a remote position distant from the mixing device.

To the internal batch mixer of the present invention, for example, a latch mechanism of a type in which a slide member is provided between the latch member and the drop door, as disclosed in Japanese Patent Application Laid-Open No. 9-220456, can be also applied. The slide member is an intermediate member sliding along the inclination direction of inclined surfaces formed on the latch member and the drop door respectively.

(Third Embodiment)

A third embodiment of the present invention will be described in reference to FIGS. 12 to 15.

(Structure of Internal Batch Mixer)

Firstly, the structure of the internal batch mixer 1 according to a third embodiment of the present invention will be described. The internal batch mixer 1 includes a mixing device 1a (refer to FIG. 15) for mixing material, and an indicator 27 (refer to FIG. 13) which displays displacement information of a fixed-side seal member 10 and an alarm which will be described later.

The mixing device 1a includes a casing 3, a pair of mixing rotors 2, 2, a rotor shaft 7 (refer to FIG. 13), and a dust stop device 50.

Figure 13:
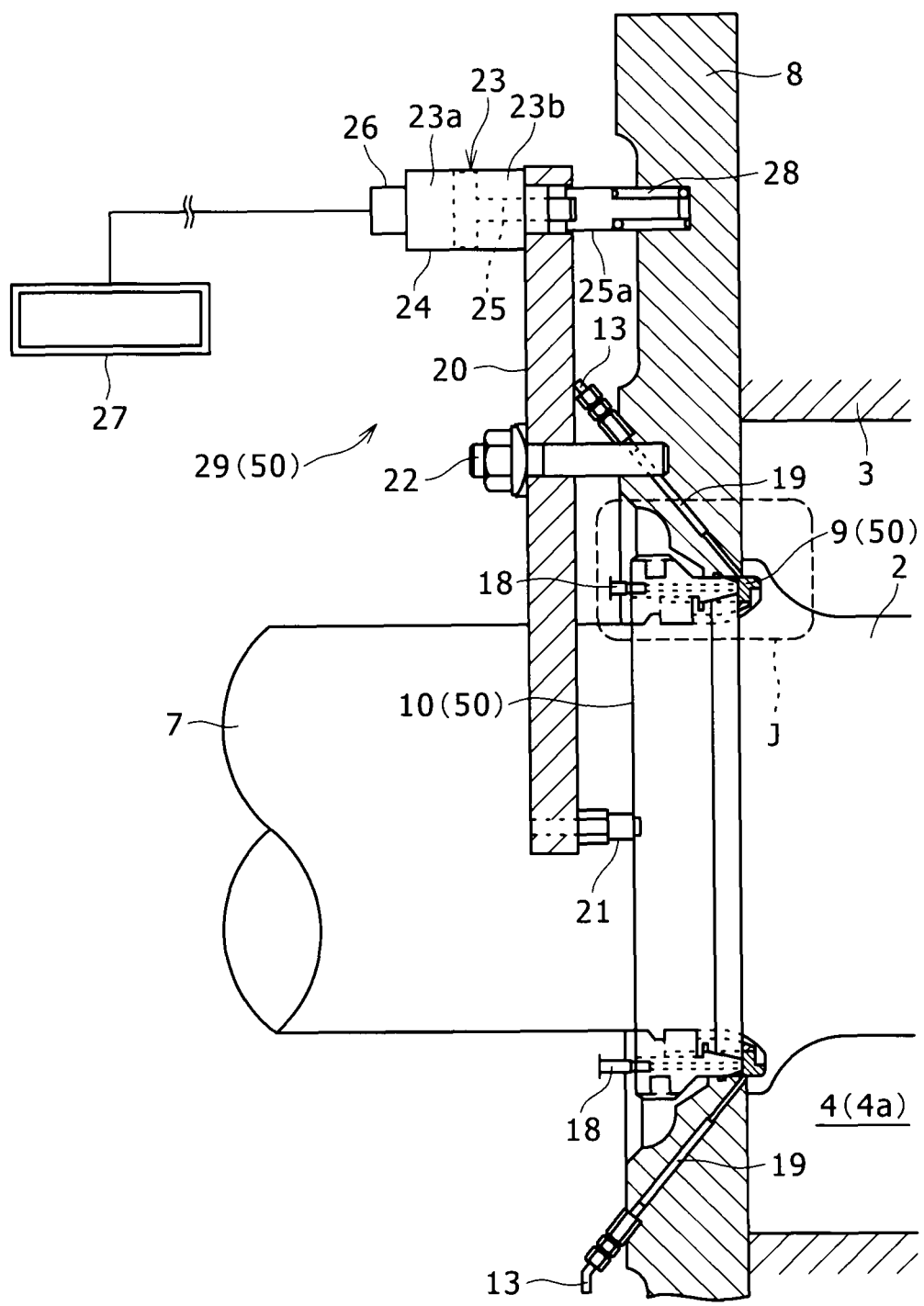
FIG. 13 is a sectional view taken along XIII-XIII of FIG. 12.

The casing 3 is formed in a hollow shape, and stores the pair of mixing rotors 2, 2 so as to be rotatable around respective axes. The casing 3 includes a medium flow channel (not shown) for cooling or heating a mixed product through the casing 3. The inner surface of the casing 3 is formed so that a vertical section thereof shows a cocoon-like shape. An end plate 8 is jointed to an end surface of the casing 3 in the axial direction of the mixing rotor 2 as shown in FIG. 13, whereby a chamber 4 composed of a lateral pair of mixing chambers 4a, 4b is formed within the casing 3.

An input port 3a for putting mixing material such as rubber or plastics into the chamber 4 is formed at the upper side center of the casing 3. A floating weight 5 for pushing the mixing material, which is put in the input port 3a, into the chamber 4 is provided on the input port 3a so as to be capable of rising and lowering. On the other hand, a discharge port 3b for discharging the material which has been mixed into a desired mixed state within the chamber 4 to the outside is formed at the lower side center of the chamber 4 in the casing 3. A drop door 6 for opening and closing the discharge port 3b is provided at a part of the casing 3 in which the discharge port 3b is formed. The floating weight 5 and the drop door 6 constitute a part of the inner wall surface of the chamber 4, during mixing of the material within the chamber 4, by being closely fitted to the casing 3.

(Dust Stop Device)

Figure 12:
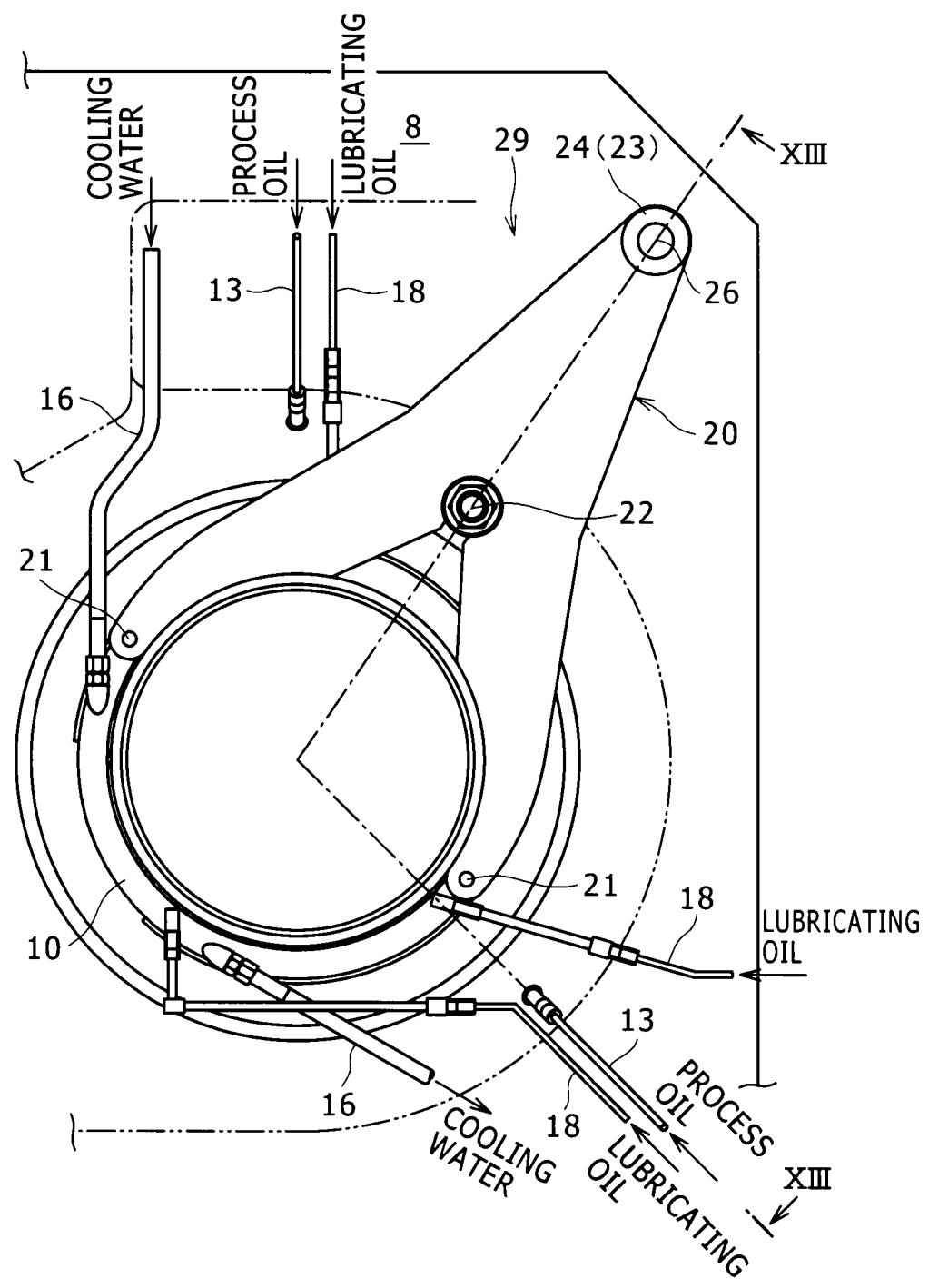
FIG. 12 is a front view of a dust stop device part in an internal batch mixer according to a third embodiment of the present invention.
Figure 14:
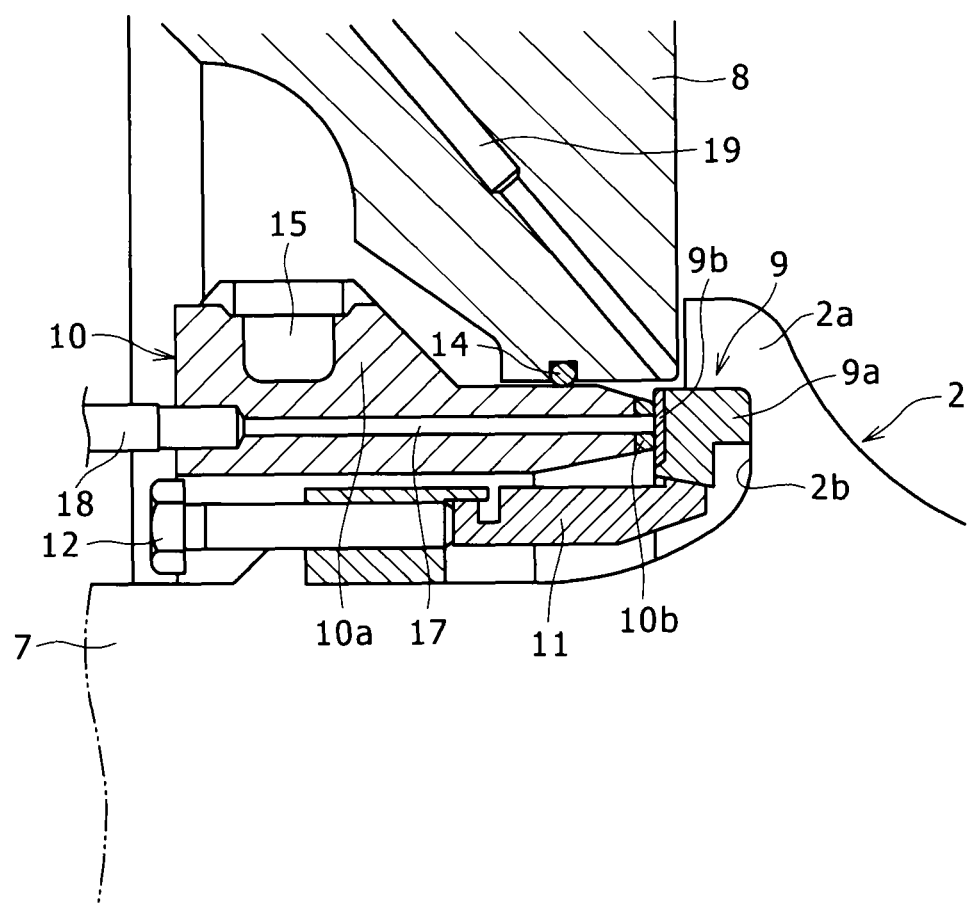
FIG. 14 is a detailed view of section J in FIG. 13.

Next, the dust stop device 50 in the internal batch mixer 1 of the third embodiment will be described. The dust stop device 50 is a device for arresting the mixing material pushed and mixed in the chamber 4 from leaking out of the mixing chamber 4a as dust from an area located in the vicinity of an end portion of the mixing rotor 2 within the mixing chamber 4a. As shown in FIGS. 12 to 14, the dust stop device 50 includes a rotation-side seal member 9, a fixed-side seal member 10, and a pressing force imparting mechanism 29. The rotation-side seal member 9 is fixed to an end surface 2b of the mixing rotor 2. A rotor shaft 7 of the mixing rotor 2 is rotatably inserted through the fixed-side seal member 10. The pressing force imparting mechanism 29 biases the fixed-side seal member 10 toward the end surface 2b of the mixing rotor 2 so that the fixed-side seal member 10 is in pressure contact with the rotation-side seal member 9.

(Rotation-side Seal Member)

The above-mentioned mixing rotor 2 is inserted through each of the mixing chambers 4a, 4b of the internal batch mixer 1. Both ends of each mixing rotor 2 are increased in diameter toward the rotor end surface 2b so that its rotor diameter is maximized at the rotor end surface 2b, as shown in FIGS. 13 and 14. Namely, diameter-increased portions 2a are formed respectively at both ends of each mixing rotor 2. The rotor shaft 7 with a shaft diameter smaller than the rotor diameter of the diameter-increased portion 2a is protruded on the inner periphery of the rotor end surface 2b. The ring-like rotation-side seal member 9 which can be divided into two pieces is fixed to the rotor end surface 2b. A circular recess is formed in the rotor end surface 2b, and the rotation-side seal member 9 is fixed to this recess. The rotation-side seal member 9 is composed of a seal member body 9a having an L-shaped section, and a ring-like sliding member 9b fixed to a rear end opposite to the rotor end surface 2b of the seal member body 9a. The sliding member 9b is attachable to and detachable from the seal member body 9a. The rotation-side seal member 9 is fixed to the rotor end surface 2b by being pressed by a ring-like collar 11 from the inner periphery toward the outer periphery. This pressing force is produced by fastening of a bolt 12. This allows the rotation-side seal member 9 to rotate integrally with the mixing rotor 2.

(Fixed-side Seal Member)

The fixed-side seal member 10 is a ring-like member which can be divided into two pieces. The rotor shaft 7 is rotatably inserted to the inside of the fixed-side seal member 10. While the above-mentioned rotation-side seal member 9 is rotated together with the mixing rotor 2, the fixed-side seal member 10 is not rotated. The fixed-side seal member 10 is composed of a ring-like seal member body 10a and a ring-like sliding member 10b fixed to a tip thereof on the mixing rotor 2 side. The sliding member 10b is attachable to and detachable from the seal member body 10a. The seal member body 10a of the fixed-side seal member 10 is liquid-tightly fitted to the end plate 8 through a seal ring 14 at a position in the vicinity of the mixing rotor 2 so as not to leak the mixed product or lubricating oil to the outside. Further, a cooling water passage 15 is formed at the rear end portion of the seal member body 10a so as to extend in the circumferential direction. A lubricating oil passage 17 is formed in the seal member body 10a so as to extend in the axial direction. A cooling water pipe 16 is connected to the cooling water passage 15. Cooling water is caused to inflow to the cooling water passage 15 through the cooling water pipe 16, whereby the fixed-side seal member 10 is cooled. A lubricating oil pipe 18 is connected to the lubricating oil passage 17. When lubricating oil inflows to the lubricating oil passage 17 through the lubricating oil pipe 18, this lubricating oil is supplied to between contact surfaces of the sliding member 10b and the sliding member 9b of the rotation-side seal member 9 through the lubricating oil passage 17.

The sliding member 9b of the rotation-side seal member 9 and the sliding member 10b of the fixed-side seal member 10 are formed of, for example, hard facing alloy. As the material applicable to the sliding member 9b and the sliding member 10b, in addition to various steels and copper alloys, materials not impregnated with oil, such as ceramics and sintered carbon, and metals impregnated with oil, such as gunmetal, cast iron and sintered metal can be given.

A process oil passage 19 is formed in the end plate 8. A process oil pipe 13 for supplying process oil is connected to the process oil passage 19. The process oil is oil such that it never adversely affects the quality of mixed product even if entrapped into the chamber 4. The process oil is supplied to between the contact surfaces of the sliding member 9b and the sliding member 10b through the process oil pipe 13 and the process oil passage 19. As the process oil, mineral oils of aroma series, naphthene series and the like can be mainly used. In mixing of vinyl chloride resin or the like, a synthetic plasticizer typified by DOP (dioctyl phthalate) is used as the process oil. Some mixers with low sliding speed between the contact surfaces such as a small mixer do not need the process oil. In this case, the process oil passage 19 can be omitted.

(Pressing Force Imparting Mechanism)

The pressing force imparting mechanism 29 will be then described. The pressing force imparting mechanism 29 includes a hydraulic cylinder 23, a linear sensor 26 attached to the hydraulic cylinder 23, and a yoke 20 to one end of which the hydraulic cylinder 23 is attached.

(Linear Actuator)

The hydraulic cylinder 23 includes a cylinder body 24 and a piston rod 25 provided within the cylinder body 24 so to be movable in the axial direction of the mixing rotor 2. The hydraulic cylinder 23 is a linear actuator in which the piston rod 25 linearly moves in the axial direction of the mixing rotor 2 by supplying oil to a head-side chamber 23a within the cylinder body 24 or discharging oil from the head-side chamber 23a. The linear actuator means an actuator provided with a moving part which linearly moves. The piston rod 25 falls into the concept of the moving part in the present invention. The hydraulic cylinder 23 biases the fixed-side seal member 10 toward the rotor end surface 2b by moving the piston rod 25 toward the rotor end surface 2b in its axial direction. The linear actuator of the present invention is not limited to the hydraulic cylinder 23. The actuation source may be pressure of other liquids without being limited to the hydraulic pressure. A pneumatic cylinder can be used also as the linear actuator.

A tip of the piston rod 25 is fitted to one end of a columnar rod end guide 25a. A spring 28 is inserted to the rod end guide 25a from the other end side. The rod end guide 25a is in contact with the end plate 8 through the spring 28.

(Linear Sensor)

The linear sensor is a sensor for measuring travel distance by linear movement of the linear actuator. The linear sensor 26 in this embodiment is attached to the hydraulic cylinder 23, and detects displacement of the piston rod 25 in the axial direction of the mixing rotor 2. Concretely, the linear sensor 26 detects the stroke or piston position of the piston rod 25 of the hydraulic cylinder 23. The linear sensor 26 is attached to a head portion of the hydraulic cylinder 23. As the linear sensor 26, for example, a magnetostrictive displacement sensor can be used. The magnetostrictive displacement sensor is a displacement sensor based on a magnetostrictive phenomenon by the Wiedemann effect. Concretely, the magnetostrictive displacement sensor is configured so that an absolute position of a magnet which moves along a rod-like sensor probe in no contact to the probe is accurately detected by causing torsional distortion in a magnetostrictive wire within the probe by the magnet, and measuring the propagation time of this distortion. As the linear sensor, a wire sensor, a laser sensor or the like is also usable.

(Yoke)

The yoke 20 is a plate member for transmitting an actuating force of the hydraulic cylinder 23 to the fixed-side seal member 10. The hydraulic cylinder 23 is attached to one end of the yoke 20, and a yoke pin 21 is attached to each of the bifurcated other ends of the yoke 20. A yoke tack 22 is inserted at the fork of the yoke 20 or substantially at the center in the longitudinal direction of the yoke 20, whereby a yoke mechanism in which the yoke 20 oscillates with the yoke tack 22 as a support point is constituted. The yoke tack 22 is fixed to the end plate 8, and the yoke 20 is supported by the yoke tack 22. Tips of the two yoke pins 21 are fitted to holes formed in the end surface opposite to the mixing rotor 2 of the fixed-side seal member 10 respectively.

The fixed-side seal member 10 is prevented from rotating by the yoke pins 21 attached respectively to the bifurcated ends of the yoke 20. The rotation of the fixed-side seal member 10 is further surely prevented by pressing the yoke pins 21 onto the fixed-side seal member 10 through the yoke 20 by the hydraulic cylinder 23.

(Display Device)

As shown in FIG. 13, the indicator 27 is electrically connected to the linear sensor 26 through an output cable. The indicator 27 is provided outside the mixing device 1a. The indicator 27 falls into the concept of the display device in the present invention. The indicator 27 displays displacement information of the fixed-side seal member 10 in a state where the fixed-side seal member 10 is in pressure contact with the rotation-side seal member 9 by the pressing force imparting mechanism 29 or in a state where the piston rod 25 of the hydraulic cylinder 23 presses the fixed-side seal member 10 to the rotation-side seal member 9. The indicator 27 fetches an output signal from the linear sensor 26 and displays the displacement information according to the detection value by the linear sensor 26. The indicator 27 can perform remote display at a position distant from the pressing force imparting mechanism 29. The indicator 27 is incorporated to a control panel or the like set near the mixing device 1. An operation monitoring screen of the control panel set near the mixing device 1a or an operation terminal screen of a centralized control system set at a location distant from the mixing device 1a can be used as the display device to display the displacement information according to the detection value by the linear sensor 26. In FIG. 13 that is a sectional view taken along XIII-XIII of FIG. 12, the indicator 27 is not drawn as a sectional view. FIG. 13 only schematically shows that the indicator 27 is wire-connected to the linear sensor 26.

The displacement information may be the position (detection value) itself of the piston rod 25 at the moment of pressing the fixed-side seal member 10 to the rotation-side seal member 9 by the piston rod 25 of the hydraulic cylinder 23, or the variation from initial position of the piston rod 25 at that time. The displacement information may be the position or variation in position (displacement) of the fixed-side seal member 10 which is obtained by converting the detection value or variation from initial position of the piston rod 25 according to the lever ratio of the yoke mechanism, or the ratio of the distance between the hydraulic cylinder 23 and the yoke tack 22 to the distance between the yoke tack 22 and the yoke pin 21. The displacement information can be displayed in the indicator 27 as a numerical value or as a graph corresponding to the numerical value.

The indicator 27 doubles as an alarm device, and has alarm display function. Concretely, the indicator 27 compares the detection value by the linear sensor 26 with a preset set value, and displays an alarm when the detection value by the linear sensor 26 reaches the set value.

(Dust Stop)

Next, the action of the dust stop device 50 will be descried through the action of the internal batch mixer 1. The hydraulic cylinder 23 of the pressing force imparting mechanism 29 biases the fixed-side seal member 10 toward the end surface 2b of the mixing rotor 2 through the yoke 20 and the yoke pin 21, whereby the sliding member 10b of the fixed-side seal member 10 is pressed onto the sliding member 9b of the rotation-side seal member 9 at a predetermined pressing force. At this time, the spring 28 an end of which contacts with the end plate 8 functions to cause the yoke 20 to follow a minute movement in the axial direction of the mixing rotor 2 so as to maintain the pressure-contact state of the sliding member 10b of the fixed-side seal member 10 to the sliding member 9b.

The function of the internal batch mixer 1 according to this embodiment will be then described.

Figure 15:
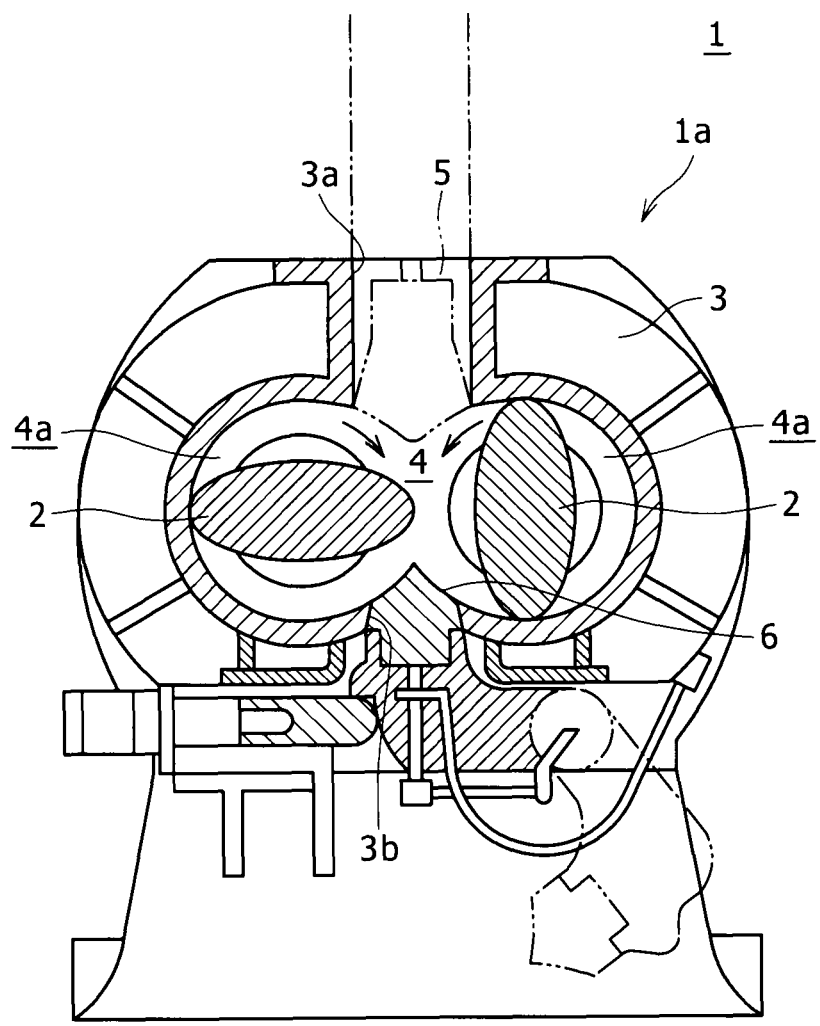
FIG. 15 is a sectional view of the internal batch mixer according to the third embodiment of the present invention.

Firstly, the upper surface of the chamber 4 is opened by separating the floating weight 5 from the casing 3 with the drop door 6 being in close contact with the casing 3 as shown in FIG. 15. After mixing material such as rubber, plastics, or filler is charged into the chamber 4 through this opening, the floating weight 5 is closely fitted to the casing 3 to push the mixing material to the inside of the chamber 4. The mixing material within the chamber 4 is cooled through the casing 3, before and after this pushing, by circulating cooling water through the cooling pipe joined to the outer wall surface of the casing 3, and the fixed-side seal member 10 is also cooled by circulating cooling water through the cooling water passage 15 as shown in FIG. 14.

Next, mixing of the mixing material is started by rotating the mixing rotors 2, 2 in mutually reverse directions and thereby shearing and dispersing the mixing material within the chamber 4 so that a mixed product in a desired mixed state can be obtained. Since the rotation-side seal member 9 is rotated together with the mixing rotor 2 upon rotation of each mixing rotor 2, the sliding member 9b of the rotation-side seal member 9 and the sliding member 10b of the fixed-side seal member 10 slide to each other at a speed according to the rotating speed of the mixing rotor 2. A friction force proportional to the pressing force by the hydraulic cylinder 23 is generated between the contact surfaces of both the sliding members 9b, 10b, and as a result, both the sliding members 9b, 10b are worn away with heating. When the mixed product is such that there is no problem for quality even if lubricating oil is slightly mixed thereto, a small amount of lubricating oil is supplied to between the contact surfaces of both the sliding members 9b, 10b through the lubricating oil passage 17 to thereby reduce the friction coefficient between the contact surfaces of both the sliding members 9b, 10b and cool both the sliding members 9b, 10b. As a result, the heating and wear of both the sliding members 9b, 10b are suppressed.

When the mixing rotor 2 is rotated with both the sliding members 9b, 10b being in pressure contact with each other as described above, the mixed product is pressed onto the inner surface of the casing 3 or the end plate 8 constituting the chamber 4 (mixing chamber 4a), whereby a part of the mixed product enters into a clearance between the diameter-increased portion 2a of the mixing rotor 2 and the end plate 8 shown in FIG. 14. On this occasion, the sliding member 10b of the fixed-side seal member 10 is in pressure contact with the sliding member 9b of the rotation-side seal member 9 at a predetermined pressing force, and the seal member body 10a of the fixed-side seal member 10 is closely fitted to the end plate 8 through the seal ring 14. Since the clearance between the diameter-increased portion 2a of the mixing rotor 2 and the end plate 8 is thus in a sealed state by the pressure contact between both the sliding members 9b, 10b and the presence of the seal ring 14, the mixed product never leaks out even if it penetrates an area inside the chamber 4 from the sealed part of the clearance. As a result, the mixed product is mixed with good quality within the chamber 4.

In this way, the dust stop for preventing the leak of dust of the mixed product is constituted by the contact surface of the rotation-side seal member 9 rotating integrally with the mixing rotor 2 and the contact surface of the fixed-side seal member 10 pressed onto this contact surface with a predetermined pressing force, and also by the seal ring 14.

(Monitoring Method for Seal Member Position)

Next, the monitoring method for seal member position is described.

(Detection Step)

While the mixing rotor 2 is rotating with both the sliding members 9b, 10b being in pressure contact with each other, a stroke (piston position) of the piston rod 25 of the hydraulic cylinder 32 pressing the fixed-side seal member 10 onto the end surface 2b of the mixing rotor 2 is detected by the linear sensor 26 attached to the head side of the hydraulic cylinder 23.

(Display Step)

The indicator 27 then displays displacement information of the fixed-side seal member 10 according to a detection value by the linear sensor 26. The displacement information of the fixed-side seal member 10 according to the detection value may be, as described above, the position itself of the piston rod 25 of the hydraulic cylinder 23 at the moment of pressing the fixed-side seal member 10 (detection value), the variation from initial position of the piston rod 25, or the position or variation in position of the fixed-side seal member 10 obtained by converting the above-mentioned detection value or variation from initial position of the piston rod 25 according to the lever ratio of the yoke mechanism. The lever ratio of the yoke mechanism is the ratio of the distance between the hydraulic cylinder 23 and the yoke tack 22 to the distance between the yoke tack 22 and the yoke pin 21. The indicator 27 displays the displacement information, whereby the operator can confirm a pushed amount of the fixed-side seal member 10 to the end surface 2b of the mixing rotor 2 from its initial position, that corresponds to just the abrasion loss of both the sliding members 9b, 10b. The operator can grasp a current total thickness of the sliding members 9b, 10b from the pushed amount of the fixed-side seal member 10. When the material of the sliding member 9b is more resistant to abrasion than that of the sliding member 10b, the thickness of the sliding member 10b is mainly grasped from the pushed amount of the fixed-side seal member 10. On the other hand, when the material of the sliding member 10b is more resistant to abrasion than that of the sliding member 9b, the thickness of the sliding member 9b is mainly grasped from the pushed amount of the fixed-side seal member 10. In general, one of the sliding member 9b and the sliding member 10b is composed of a member resistant to abrasion, and the other member is composed of a member susceptible to abrasion, compared with the one member.

(Alarm Activation Step)

Next, the indicator 27 compares the detection value from the linear sensor 26 with a set value which is preliminarily stored in a storage unit of the indicator 27, and gives an alarm (warning) when the detection value reaches the set value. At this time, the indicator 27 displays the alarm. The issuing of the alarm is never limited to the form in which the indicator 27 displays the alarm. For example, an alarm device incorporated in the indicator 27 and configured to issue an alarm by a method other than display may give an alarm, or an alarm device provided separately from the indicator 27 may give an alarm by issuing warning. The alarm may be, besides the alarm display to be displayed on the indicator 27 or the like, an audible alarm emitted from an alarm system. The alarm display can be attained by displaying warning characters, by lighting an alarm lamp, by changing the display form of displacement information of the fixed-side seal member 10 displayed on the indicator 27, by changing the background color of the display screen, or the like. The audible alarm may be emitted by use of an oscillating circuit which generates siren sound, alarm bell sound or the like. Further, a form such that a control device which has read an output waveform of audible alarm stored in a memory causes a speaker to generate an audible alarm according to the output waveform can be adopted.

As described above, the indicator 27 displays displacement information according to the detection value from the linear sensor 26 at the moment of pressing the fixed-side seal member 10 by the hydraulic cylinder 23, whereby the operator can easily grasp displacement of the fixed-side seal member 10 during the operation of the mixer 1. In other words, the indicator 27 facilitates grasp of the wear level of the sliding member 10b or the sliding member 9b that is a wearing member. The operator can grasp the wear level of the wearing member without leaving the working site. The operator can also know the coming of the replacement time (life) of the wearing member before the mixing material within the chamber 4 begins to leak to the outside through a clearance in the vicinity of the end of the mixing rotor 2 since he/she can check for the wear level of the wearing member during the operation of the internal batch mixer 1. The operator can prevent continuous use of the wearing member beyond its application limit by monitoring the wear level of the wearing member through the indicator 27. As a result, breakage of peripheral facilities resulting from the leak of the mixing material, for example, breakage of peripheral piping or a temperature sensor can be prevented.

Further, an arithmetic device (not shown) with software for predicting the life of wearing member based on log data for the detection value by the linear sensor 26 showing abrasion data of the wearing member is incorporated to the control panel set near the mixing device 1a, the operation terminal of the centralized control system or the like, and an output signal from the linear sensor 26 is computed or analyzed by this arithmetic device, whereby the life of the sliding member 10b or the sliding member 9b that is a wearing member can be also predicted.

If the set value to be stored in the indicator 27 is set to a value corresponding to the replacement time or application limit of the sliding member 10b or the sliding member 9b, the indicator 27 gives an alarm according to the coming of the replacement time or application limit of the sliding member 10b or the sliding member 9b that is a wearing member. The operator can further surely grasp the wear level of the wearing member by this alarm.

The above-mentioned alarm device preferably can store at least two stages of the alarm set value. For example, the first-stage alarm set value is used to announce that the wearing member has reached the replacement time before the application limit, and the second-stage alarm set value is used to announce that the wearing member has reached the application limit. According to this, in addition to the alarm given for the purpose of machine protection when the wearing member has reached the application limit, a preliminary alarm can be given to announce that the wearing member has reached the replacement time for securing of a preparation period required for manufacturing or the like of the wearing member, planning of replacement work of the wearing member or the like.

The indicator 27, preferably, doubles as the alarm device and has the function of displaying the above-mentioned alarms. The indicator 27 which displays displacement information of the fixed-side seal member 10 displays the above-mentioned alarms, whereby the operator can grasp the wear level of the wearing member and determine whether the wear is at the level of the replacement time or application limit of the wearing member only by monitoring the indicator 27.

Further, the indicator 27 is preferably configured to perform alarm display by changing the display method of the displacement information of the fixed-side seal member 10. The alarm display by changing the display method of the displacement information of the fixed-side seal member 10 is attained, for example, by flashing, color reversion or color change of the displacement information of the fixed-side seal member 10 displayed on the indicator 27 (numerical display, graphic display), or a combination thereof. The color change is overall color change or partial color change of the indication on the indicator 27. Such a change in the display method of displacement information by the indicator 27 allows the operator to easily and simultaneously perform the grasp of the wear level of wearing member and the determination for whether the wear is at the level of the replacement time or application limit without changing the direction of eyes.

Although the third embodiment relating to the structure in which the fixed-side seal member is pressed in contact with the rotation-side seal member of the present invention has been described above, the present invention is never limited to the above-mentioned third embodiment, and can be carried out with various changes without departing from the scope of the claims.

[Summary of Embodiments]

The above-mentioned embodiments can be summarized as follows.

The internal batch mixer according to the above-mentioned embodiments includes: a mixing device for mixing material; and a display device provided outside the mixing device, wherein the mixing device includes: a casing in which the material is mixed and which has a material discharge opening formed to discharge the mixed material; a door which opens and closes the material discharge opening by rotating around a shaft, and blocks the material discharge opening when it is in a closed state; and a latch mechanism which holds, during mixing of the material within the casing, the door in a latched state, the latched state being a state in which the latch mechanism presses the door to the casing so that the door blocks the material discharge opening and cannot be opened, and which releases the latched state when discharging the material mixed within the casing out of the casing, the latch mechanism includes: a latch member provided to be contactable with the door; a linear actuator which has a linearly-movable moving part and supplies power to the latch member to direct the latch member to the door side by moving the moving part toward the door; and a linear sensor which measures distance of linear movement of the moving part by the linear actuator, and the display device displays displacement information of the latch member based on the distance of linear movement of the moving part measured by the linear sensor.

In this structure, the display device provided outside the mixing device can display, based on a measurement value by the linear sensor, latch member displacement information, or information about the stroke of the moving part of the linear actuator. Therefore, the operator can easily grasp information about wear status in a contact area between the door and the latch member from the latch member displacement information displayed in the display device during the operation of the mixer. The operator can know the replacement time of wearing member since he/she can grasp the wear status in the contact area during the operation of the mixer. The operator further can monitor the wear status in the contact area by monitoring the displacement information displayed in the display device. As a result, deformation of the edge portion forming the material discharge opening of a portion near the inner surface of the casing, the deformation resulting from continuous use of a wearing member beyond its application limit, can be prevented.

In this embodiment, the internal batch mixer is used to mix material such as rubber or plastics. The casing is a housing member having a mixing chamber formed inside. In the mixing chamber within the casing, mixing of the material is performed by mixing rotors. The door is a hinged door, and opens and closes in an arc around a rotary shaft.

The linear actuator is an actuating device which converts input energy to linear movement, for example, such as a hydraulic cylinder, a pneumatic cylinder, or a ball screw mechanism. The distance of linear movement of the moving part of the linear actuator means a travel distance of the moving part of the linear actuator along a straight line. For example, when the linear actuator is the hydraulic cylinder, the moving part is a piston, and the distance of linear movement corresponds to the travel distance of the piston.

The latch mechanism may be of the slide type in which the latch member linearly moves, or of the toggle type in which the latch member rotationally moves. Namely, the moving direction of the latch member by power supply from the linear actuator may be a direction along the linear movement of the moving part of the linear actuator or any other direction.

The latch member of the latch mechanism may be directly attached to the moving part of the linear actuator. In this case, the power is directly supplied from the moving part of the linear actuator to the latch member. A different member (link member) may be provided between the latch member of the latch mechanism and the moving part of the linear actuator to indirectly supply the power of the linear actuator to the latch member through the different member. The moving part of the linear actuator and the latch member may be formed as an integrated unit.

The linear sensor is a sensor for measuring the distance of linear movement of the moving part of the linear actuator. As this linear sensor, for example, a linear encoder, a linear potentiometer or the like is applied. The sensor system which can be used for this linear sensor is a magnetostrictive system, a laser system, a wire system or the like. The linear sensor may be configured to perform digital output or analog output.

The latch member displacement information is information about the position or variation in position of the latch member in the latch state, which directly or indirectly shows the stroke of the linear actuator. The operator can grasp the wear status in the contact area between the door and the latch member from this displacement information.

The latch member displacement information to be displayed in the display device may be a value (measurement value) as is of linear movement distance of the moving part of the linear actuator, or a value of rotating angle of the latch member obtained by converting the value of linear movement distance of the moving part of the linear actuator when the latch mechanism is of the toggle type. The displacement information of the latch member may be a value showing the relative position to initial position, e.g., a value of variation in stroke relative to initial stroke of the linear actuator, or a value showing an absolute positional variation, e.g., a value of variation in stroke measurement value of the linear actuator.

The display device may display, for example, the value of linear movement distance of the moving part of the linear actuator point by point on a real-time basis, or may display the value of rotating angle of the latch member obtained by converting the linear movement distance of the moving part of the linear actuator in the case of the toggle-type latch mechanism.

The display device, which can perform remote display at a location distant from the latch mechanism, may be an operation monitor display of a control panel set in the vicinity of the mixing device, or an operation display (operation terminal screen) of a centralized control system set in a location distant from the mixing device.

For example, the display device may directly display a numerical value of the latch member displacement information or may graphically display the numerical value of the latch member displacement information. The graphical display may be display by bar chart, circular chart, line chart or the like. As the display device, a liquid crystal display, a cathode-ray tube, a plasma display, an LED or the like can be used.

In the door, a consumable part such as a contact plate, that is a replacement part, may be provided at a contact portion with the latch member, or such a consumable part may be omitted. In the latch member, a consumable part such as a latch striker, that is a replacement part, may be provided at a contact portion with the door, or such a consumable part may be omitted.

The above-mentioned internal batch mixer may further include a storage device which stores a set value relating to the displacement information of the latch member; and an alarm device which compares the displacement information of the latch member in the latched state with the set value, and gives an alarm when the displacement information of the latch member has reached the set value.

In this structure, when the value of latch member displacement information based on the measurement value by the linear sensor reaches an optional set value stored in the storage device, the alarm is given from the alarm device. Therefore, when the above-mentioned set value is a reference value corresponding to the replacement time or application limit of a wearing member, the alarm device gives the alarm when the wear status of the wearing member reaches the replacement time, application limit or the like, and the operator can further surely grasp the wear status of the wearing member by this alarm.

The alarm may be an alarm display to be displayed in the display device or the like, or an audible alarm to be given from an alarm system. The alarm display can be attained by displaying warning characters, by lighting an alarm lamp, by changing the display mode of the latch member displacement information displayed in the display device, by changing the background color of the display screen, or the like. The audible alarm can be emitted by use of an oscillating circuit which generates siren sound, alarm bell sound, etc., or can be emitted by use of a speaker by reading an output waveform of audible alarm recorded on a memory.

As the storage device, a RAM (random access memory), a hard disk drive or the like, which is incorporated to the above-mentioned control panel or the above-mentioned centralized management system, can be used.

The alarm device and the display device may be composed of different devices or of the same device.

In this structure, the "latch member displacement information" to be compared with the set value may be the same information as the information (display value) displayed in the display device, or information differed from the display value.

In the above-mentioned internal batch mixer provided with the storage device, the storage device is preferably configured so that at least two stages of the set value can be stored for the one linear sensor In this structure, the alarm device stores two or more stages of set values as the reference value corresponding to the measurement value of linear movement distance of the moving part of the linear actuator which is measured by the linear sensor in the latched state, whereby the alarm device can give stepwise alarms for the wear status of wearing member. This structure allows the alarm device, for example, to give a preliminary alarm for the replacement time of wearing member and an alarm announcing the wear limit (application limit) of wearing member. In this case, securement of a preparation period for consumable parts, work planning, or the like can be efficiently performed based on this preliminary alarm, while the use of the wearing member beyond its application limit can be prevented based on the alarm announcing the wear limit to protect machine parts.

In the above-mentioned internal batch mixer, the display device may double as the alarm device and have a function to display the above alarm According to this structure, since the alarms are displayed in the display device which displays the latch member displacement information, the operator can visually recognize the alarms. Therefore, the operator can easily grasp the wear status of wearing member and determine for whether the wear status is at the level of the replacement time or application limit of wearing member.

In this case, the display device may be configured so as to perform the display of the alarm by changing a display mode of the displacement information of the latch member Since the operator can visually recognize the latch member displacement information and the alarm at the same time in this structure, the grasp of the wear status of wearing member and the determination for whether the wear status is at the level of the replacement time or application limit of wearing member can be easily and simultaneously performed.

The "change in display mode of the latch member displacement information" may be "flashing", "reversal or change of display color such as character color or background color", "overall or partial color change in display" or the like of the latch member displacement information composed of a numerical value or graph on the screen of the display device.

Otherwise, the internal batch mixer according to the above-mentioned embodiments includes a mixing device for mixing material; and a display device provided outside the mixing device, wherein the mixing device includes: a casing having a mixing chamber inside; a rotor inserted to the mixing chamber; a rotor shaft provided to protrude from a rotor end surface that is an end surface in the axial direction of the rotor; and a dust stop device for arresting leak of the material within the mixing chamber to the outside, and the dust stop device includes: a rotation-side seal member fixed to the rotor end surface to be rotated integrally with the rotor; a ring-like fixed-side seal member through which the rotor shaft is rotatably inserted; and a pressing force imparting mechanism which biases the fixed-side seal member toward the rotor end surface so that the fixed-side seal member is in pressure contact with the rotation-side seal member, and the pressing force imparting mechanism includes: a linear actuator which has a moving part provided to be movable in the axial direction of the rotor, and biases the fixed-side seal member toward the rotor end surface by moving the moving part toward the rotor end surface; and a linear sensor attached to the linear actuator to detect displacement of the moving part in the axial direction of the rotor, and the display device displays displacement information of the fixed-side seal member based on a detection value by the linear sensor in a state where the fixed-side seal member is in pressure contact with the rotation-side seal member by the pressing force imparting mechanism.

According to this structure, the display device provided distantly outside the mixing device can display displacement information of the fixed-side seal member according to a detection value by the linear sensor in a state where the fixed-side seal member is in pressure contact with the rotation-side seal member by the pressing force imparting mechanism, for example, stroke information of the linear actuator. Therefore, the operator can easily grasp a displacement of the fixed-side seal member, or a wear status of wearing member, during the operation of the mixer. Since the operator can grasp the wear status of wearing member during the operation of the internal batch mixer, he/she can know the coming of the replacement time or life of wearing member for the seal members before the mixing material within the mixing chamber begins to leak to the outside through a clearance in the vicinity of the rotor end surface. Further, continuous use of a wearing member beyond its application limit can be prevented by monitoring the wear status of the wearing member on the display device. As a result, breakage of peripheral facilities resulting from the leak of the mixing material, for example, breakage of peripheral piping or a temperature sensor can be prevented.

The above-mentioned internal batch mixer provided with the seal members preferably includes an alarm device which compares the detection value with a preset set value, and gives an alarm when the detection value has reached the set value.

According to this structure, a value corresponding to the detection value at the time when the wearing member has reached the replacement time or application limit is taken as the set value, whereby the alarm device can give the alarm according to the coming of the replacement time or application limit of wearing member. Thus, the operator can further surely grasp the wear status of wearing member by this alarm.

In this case, the alarm device is preferably constituted so that at least two stages of the set value can be stored According to this structure, in addition to the alarm given to announce that the wearing member has reached the application limit for machine protection, a preliminary alarm can be given to announce that the wearing member has reached the replacement time prior to the application limit. As a result, securement of a preparation period for manufacturing or the like of wearing members, planning of replacement work of the wearing member, or the like can be facilitated.

In the above-mentioned internal batch mixer, the display device preferably doubles as the alarm device and has a function to display the alarm.

This structure allows the operator to easily perform the grasp of wear level of wearing member and the determination for whether the wear is at the level of the replacement time or application limit only by viewing the display device.

In this case, the display device is preferably configured to perform the display of the alarm by changing a display method of the displacement information.

This structure allows the operator to easily and simultaneously perform the grasp of wear level of wearing member and the determination for whether the wear is at the level of the replacement time or application limit only by viewing the display device.

The invention claimed is:
1. An internal batch mixer, comprising:
a mixing device for mixing material; and
a display device provided outside said mixing device, wherein said mixing device includes:
a casing in which the material is mixed and which has a material discharge opening formed to discharge the mixed material;
a door which opens and closes said material discharge opening by rotating around a shaft, and blocks said material discharge opening when it is in a closed state; and
a latch mechanism which holds, during mixing of the material within said casing, said door in a latched state, the latched state being a state in which said latch mechanism presses said door to said casing so that said door blocks said material discharge opening and cannot be opened, and which releases the latched state when discharging the material mixed within said casing out of said casing, said latch mechanism includes:

a latch member provided to be contactable with said door;

a linear actuator which has a linearly-movable moving part and which supplies power to said latch member to direct said latch member to said door side by moving said moving part toward said door; and a linear sensor which measures distance of linear movement of said moving part by said linear actuator, and said display device displays displacement information of said latch member based on the distance of linear movement of said moving part measured by said linear sensor, wherein the internal batch mixer further includes: a storage device which stores a set value relating to the displacement information of said latch member; and an alarm device which compares the displacement information of said latch member in the latched state with the set value, and gives an alarm when the displacement information of said latch member has reached the set value.

2. The internal batch mixer according to claim 1, wherein said storage device is configured so that at least two stages of the set value can be stored for said one linear sensor.

3. The internal batch mixer according to claim 1, wherein said display device doubles as said alarm device and has a function to display the alarm.

4. The internal batch mixer according to claim 3, wherein said display device is configured so as to perform the display of the alarm by changing a display mode of the displacement information of said latch member.

5. An internal batch mixer, comprising:

a mixing device for mixing material; and a display device provided outside said mixing device, wherein said mixing device includes:

a casing having a mixing chamber inside;

a rotor inserted to said mixing chamber; a rotor shaft provided to protrude from a rotor end surface that is an end surface in the axial direction of said rotor; and a dust stop device for arresting leak of the material within said mixing chamber to the outside, and said dust stop device includes:

a rotation-side seal member fixed to said rotor end surface to be rotated integrally with said rotor;

a ring-like fixed-side seal member through which said rotor shaft is rotatably inserted; and a pressing force imparting mechanism which biases said fixed-side seal member toward said rotor end surface so that said fixed-side seal member is in pressure contact with said rotation-side seal member, and said pressing force imparting mechanism includes:

a linear actuator which has a moving part provided to be movable in the axial direction of said rotor, and which biases said fixed-side seal member toward said rotor end surface by moving said moving part toward said rotor end surface; and a linear sensor attached to said linear actuator to detect displacement of said moving part in the axial direction of said rotor, and said display device displays displacement information of said fixed-side seal member based on a detection value by said linear sensor in a state where said fixed-side seal member is in pressure contact with said rotation-side seal member by said pressing force imparting mechanism, wherein the internal batch mixer further includes an alarm device which compares the detection value with a preset set value, and gives an alarm when the detection value has reached the set value.

6. The internal batch mixer according to claim 5, wherein said alarm device is constituted so that at least two stages of the set value can be stored.

7. The internal batch mixer according to claim 5, wherein said display device doubles as said alarm device and has a function to display the alarm.

8. The internal batch mixer according to claim 7, wherein said display device is configured to perform the display of the alarm by changing a display method of the displacement information.

* * * * *